United States Patent
Suman

(10) Patent No.: US 10,119,657 B2
(45) Date of Patent: Nov. 6, 2018

(54) PROPANE TANK CONTINUOUS MONITORING SYSTEM

(71) Applicant: Shailendra Suman, Matthews, NC (US)

(72) Inventor: Shailendra Suman, Matthews, NC (US)

(*) Notice: Subject to any disclaimer, the term of this patent is extended or adjusted under 35 U.S.C. 154(b) by 0 days.

(21) Appl. No.: 15/814,374

(22) Filed: Nov. 15, 2017

(65) Prior Publication Data

US 2018/0073682 A1   Mar. 15, 2018

Related U.S. Application Data

(63) Continuation-in-part of application No. 15/224,645, filed on Jul. 31, 2016, now Pat. No. 9,851,053, which is a continuation-in-part of application No. 13/922,217, filed on Jun. 19, 2013, now Pat. No. 9,453,611.

(60) Provisional application No. 61/661,766, filed on Jun. 19, 2012.

(51) Int. Cl.
| | |
|---|---|
| *F17C 13/02* | (2006.01) |
| *G08C 17/02* | (2006.01) |
| *G08B 25/08* | (2006.01) |
| *H04Q 9/00* | (2006.01) |

(52) U.S. Cl.
CPC .......... *F17C 13/026* (2013.01); *F17C 13/028* (2013.01); *G08B 25/08* (2013.01); *G08C 17/02* (2013.01); *H04Q 9/00* (2013.01); *F17C 2250/0426* (2013.01); *F17C 2250/0439* (2013.01)

(58) Field of Classification Search
CPC .............. F17C 13/026; F17C 13/028; F17C 2250/0426; F17C 2250/0439; G08B 25/08; G08C 17/02; H04Q 9/00
See application file for complete search history.

(56) References Cited

U.S. PATENT DOCUMENTS

| | | | |
|---|---|---|---|
| 5,127,266 A * | 7/1992 | Maresca | G01F 23/2962 181/124 |
| 6,012,411 A * | 1/2000 | Hochbrueckner | F17C 13/002 116/200 |
| 6,708,573 B1 | 3/2004 | Cohen et al. | |
| 8,171,786 B2 | 5/2012 | Burris | |
| 8,370,088 B2 | 2/2013 | Ammouri et al. | |
| 2004/0093948 A1* | 5/2004 | Kelner | G01H 5/00 73/597 |

(Continued)

FOREIGN PATENT DOCUMENTS

| | | |
|---|---|---|
| WO | 2006014511 | 2/2006 |
| WO | 2009128081 | 10/2009 |

*Primary Examiner* — Sisay Yacob
(74) *Attorney, Agent, or Firm* — Geoffrey Gelman

(57) ABSTRACT

An apparatus, system and method for measuring quantity of a material are disclosed. One or more sensors are used to measure the quantity of the material are measured and error causing parameters are also measured. Error causing parameters are processed by executing one or more correction methodologies to determine a correction output. The quantity of the material is measured by using the correction output. One or values associated with the quantity of the material are measured and displayed. The one or more values are transmitted to a server and informative messages are received from the server.

22 Claims, 24 Drawing Sheets

(56) References Cited

U.S. PATENT DOCUMENTS

| | | |
|---|---|---|
| 2005/0088307 A1 | 4/2005 | Schaffer et al. |
| 2005/0247123 A1 | 11/2005 | Fuse |
| 2007/0163568 A1 | 7/2007 | Murray et al. |
| 2007/0261894 A1 | 11/2007 | Harish |
| 2009/0005930 A1 | 1/2009 | Koebrick |
| 2009/0025474 A1 | 1/2009 | Lagergren |
| 2009/0057036 A1 | 3/2009 | Oxocelhay |
| 2010/0241371 A1 | 9/2010 | Ammouri et al. |
| 2010/0256930 A1 | 10/2010 | Wolford et al. |
| 2011/0174551 A1 | 7/2011 | Lucas et al. |
| 2015/0151662 A1* | 6/2015 | Hetcher .................. B60P 1/60 406/10 |
| 2016/0011036 A1 | 1/2016 | Wiersma et al. |

* cited by examiner

1200

PROPANE TANK CONTINUOUS MONITORING SYSTEM

The present application claims the benefit of priority of U.S. Provisional Patent Application No. 61/661,766, entitled "PROPANE TANK CONTINUOUS MONITORING SYSTEM", and filed Jun. 19, 2012; U.S. patent application Ser. No. 13/922,217, entitled "PROPANE TANK CONTINUOUS MONITORING SYSTEM", and filed Jun. 19, 2013; and U.S. patent application Ser. No. 15/224,645, entitled "PROPANE TANK CONTINUOUS MONITORING SYSTEM", and filed Jul. 31, 2016, the entirety of each of which is hereby incorporated by reference herein for all purposes.

BACKGROUND

These days lot of scales are developed to measure quantity of many types of materials including cooking gas or any other fuel. The cooking and industrial gases stored in cylinders/tanks/bottles/canisters which are commonly used for cooking, heating, barbequing, lighting, and other commercial use are currently fitted with inline gas pressure sensors to monitor and assess the quantity of gas left. However, while measuring the quantity of material or fuel, so many errors are observed due to which there comes a variance in actual measurement. Also, management of fuel has to be done manually by submitting request for refilling by regularly checking the fuel quantity etc.

Currently it is difficult to ascertain the amount of Gas received and the amount remaining in a cylinder at any point of time. Typically, an exchange of a used cylinder for a full one has to be booked in advance, e.g., with an Oil/Gas company or their dealer. To avoid premature or late exchanges, it would be useful to accurately know the amount of Gas remaining in a cylinder, and to be able to predict when a new cylinder would be required.

In the conventional systems and methods, the scale can share various data such as weight information or data; battery status etc. in digital format to various wired or wireless devices uniquely or on standard communication formats. However, the sharing of data requires large bandwidth. Also, there is no system to assist remotely in the management of material in a container by generating automatic requests.

Therefore, a system and method capable of considering errors while measuring the quantity of material and also capable of exchanging data in an economic way would be needed.

SUMMARY

Various embodiments provide systems, devices, apparatus, and/or methods for measuring quantity of a material. The material may include fuel in a storage tank. A sensor may transmit an outgoing acoustic signal into the tank, and such signal may be reflected off the surface of the material, whereby the reflected signal is detected as an incoming signal. The time between the transmission of the outgoing signal and the detection of the incoming reflected signal, factoring in the speed of sound within the material, may be used to estimate the distance to the surface of the material. This distance, together with knowledge of the geometry of the storage tank, may be used to estimate the amount of material remaining in the storage tank. In various embodiments, the temperature of the material may be determined, and the temperature dependent speed of sound within the material may be used to determine the speed of sound, and thereby to increase the accuracy of the estimate of the quantity of material remaining.

Various embodiments comprise at least one sensor configured to measure the quantity of the material and one or more error causing parameters. The apparatus further comprises a processor in communication with the sensors, coupled to a memory. The processor configured to determine an effect of the error causing parameters while measuring the quantity of the material by executing one or more modules stored in the memory. The one or more modules further comprises a correction module configured to execute one or more correction methodology with respect to the error causing parameters so measured, to determine a correction output, the correction methodology determines a variance caused due to the error causing parameter in the measurement of the quantity of the material. The apparatus further comprises a measurement device configured to measure periodically one or more values associated with the quantity of the material by using the correction output and an output device configured to display one or more values associated with the quantity of the material and to generate a notification for a user in a customized manner.

Various embodiments further disclose a system for measuring a quantity of a material, the quantity of the material is further communicated to a server in a network. The system comprises at least one sensor coupled to the load bearing platform, configured to measure the quantity of the material and one or more error causing parameters in the measurement of the quantity of the material. The system further comprises a processor in communication with at the sensors and coupled to a memory. The processor configured to determine an effect of the error causing parameters while measuring the quantity of the material by executing one or more modules stored in the memory. The one or more modules further comprises a correction module configured to execute one or more correction methodology with respect to the error causing parameters to determine a correction output, the correction methodology determines a variance caused due to the error causing parameter in the measurement of the quantity of the material. The system further comprises a measurement device configured to measure periodically one or more values associated with the quantity of the material by using the correction output and a transceiver configured to transmit the values associated with the quantity of the material to the server in the network. The transceiver is further configured to receive one or more informative message from the server with respect to the values transmitted to the server, such that the informative message provide assistance in management of the material in the container. The system further comprises an output device configured to display one or more values associated with the material and the informative message to generate a notification for a user in a customized manner.

DETAILED DESCRIPTION

Apparatus, devices, systems and methods for measuring quantity of a material are described. The apparatus and system are provided with a load bearing platform such as weighing scale to hold a container storing the material. The load bearing platform facilitates in measuring quantity of the material such as fuel, the fuel may include Propane or LPG (Liquefied Petroleum Gas). The weighing scale compensates for one or more error causing parameters in the weighing scale caused due to creep value, zero balance factor, temperature factor, tank variance factor, etc.

The errors are compensated using an appropriate correction methodology in order to determine a correction output. The correction methodology considers the variance caused due to the error causing parameter and compensates for the error and shows an exact measurement of quantity of the material in the container. The values with respect to the quantity of the material may be displayed on a display device. Further, the values may be transmitted to a server using any of the communication channels with communication devices.

While aspects of described apparatus, system and method for measuring quantity of a material may be implemented in any number of different computing systems, environments, and/or configurations, the embodiments are described in the context of the following exemplary system.

Figure 1:
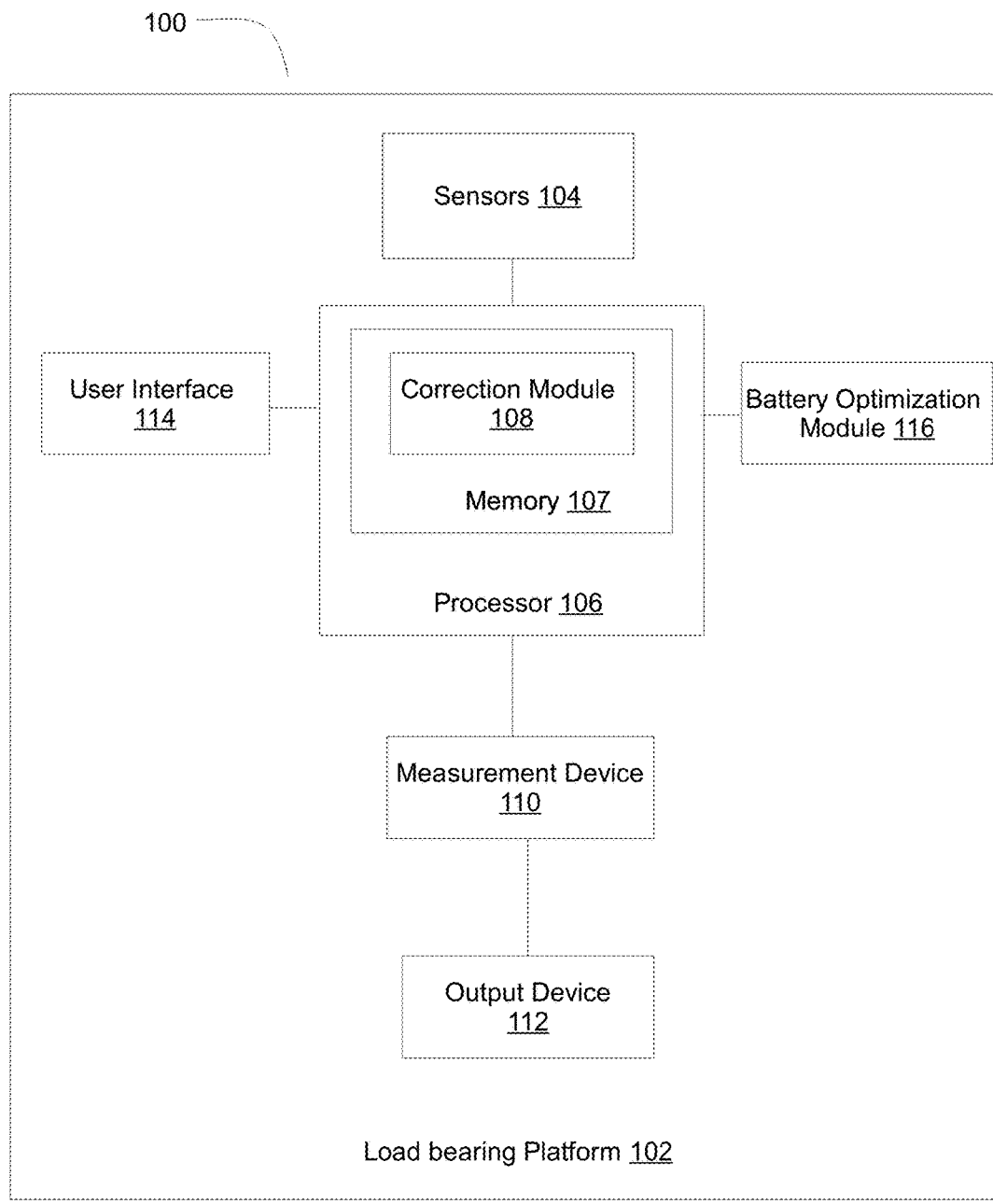
FIG. 1 illustrates an apparatus for measuring quantity of a material in accordance with some embodiments.

Referring to FIG. 1, an apparatus 100 comprises a load bearing platform 102. The load bearing platform supports sensors 104 and a processor 106 coupled to a memory 107. The memory stores a correction module 108. The apparatus further comprises a measurement device 110 and an output device 112. The apparatus further comprises a user interface 114 and a battery optimization module 116.

Figure 2A:
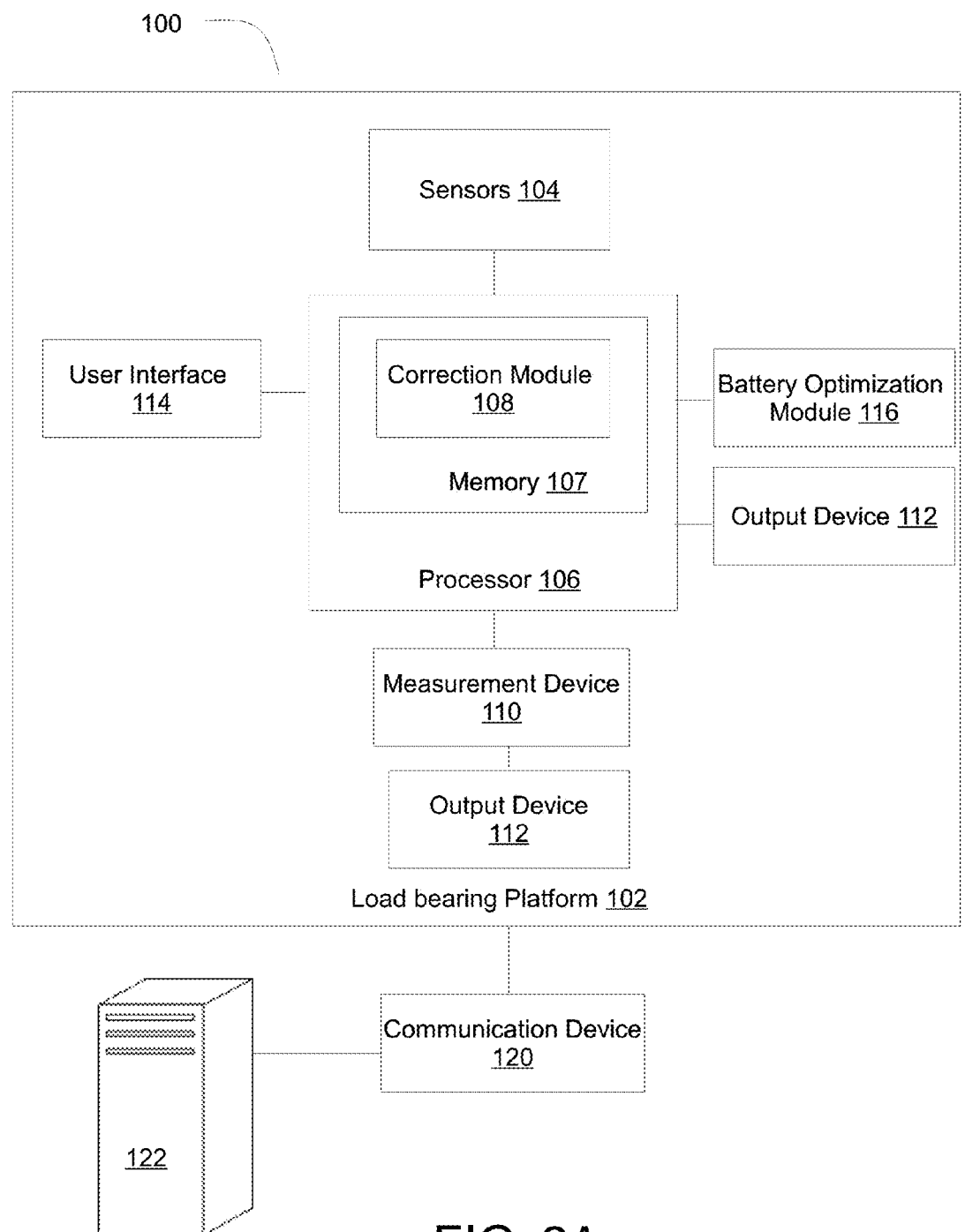
FIG. 2(a) illustrates system architecture for measuring quantity of the material and sharing the quantity with a server in accordance with some embodiments.
Figure 2B:
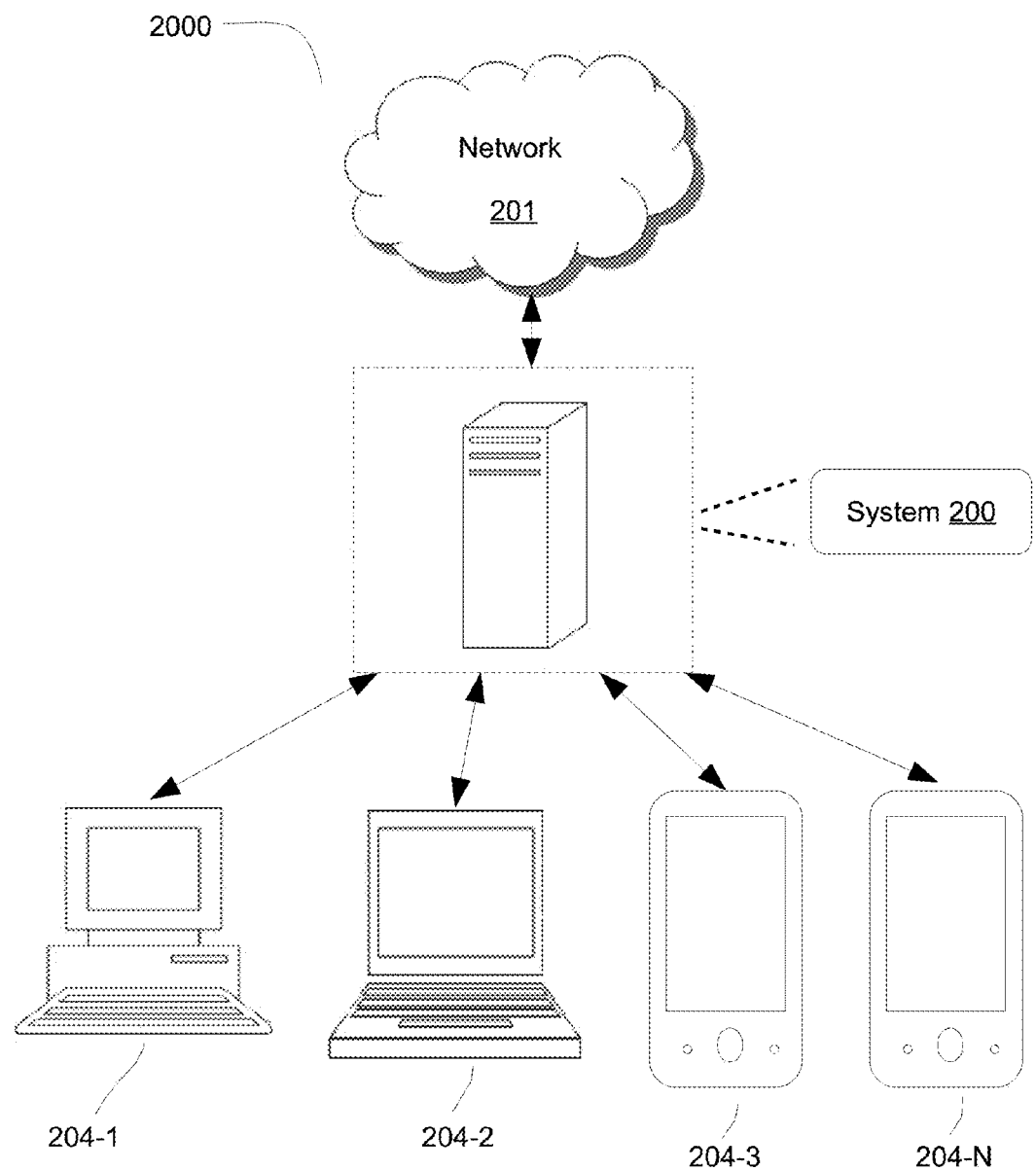
FIG. 2(b) illustrates the distributed architecture of the system for measuring quantity of the material in accordance with some embodiments.
Figure 2C:
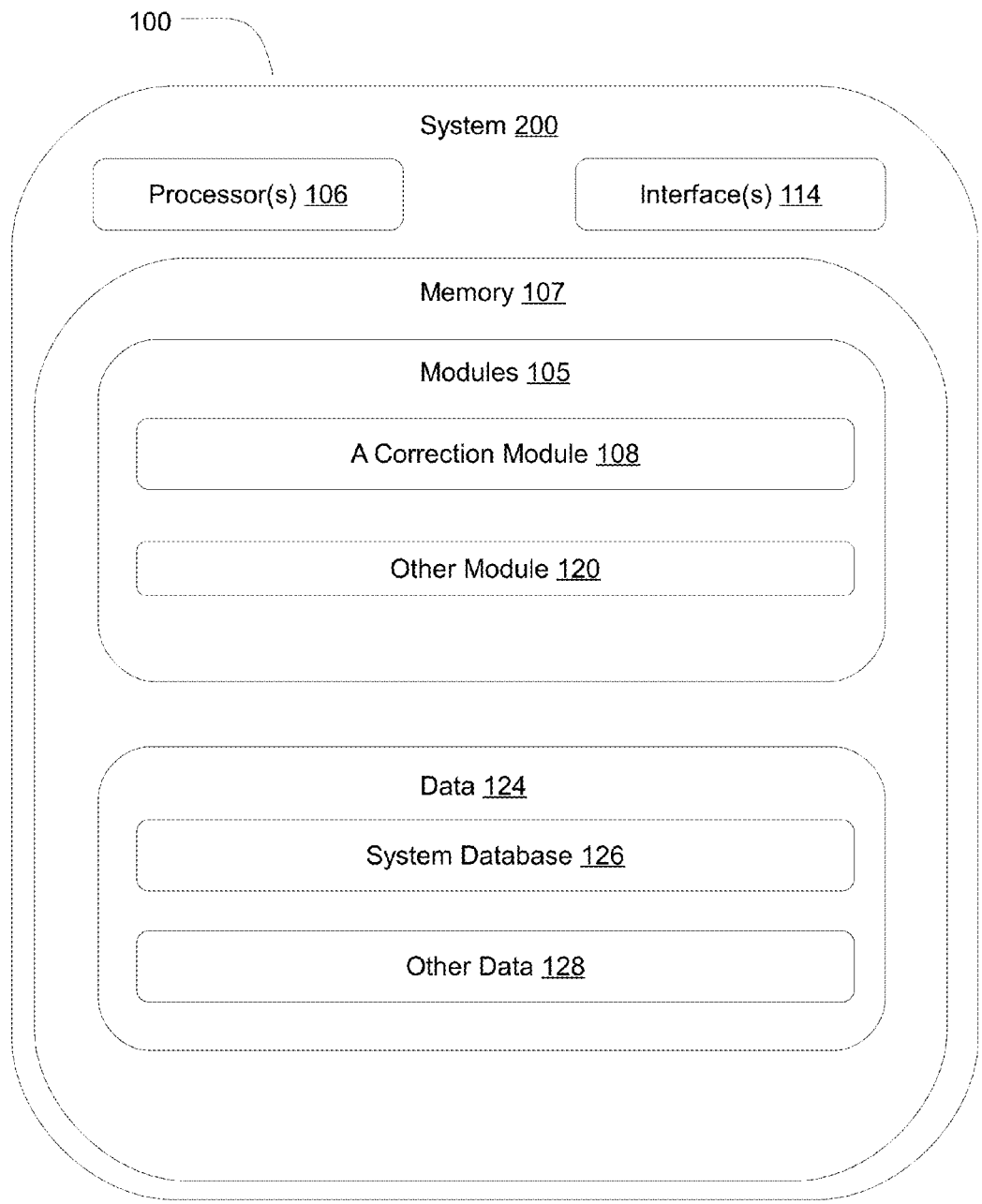
FIG. 2(c) illustrates the system modules for measuring the quantity of the material in accordance with some embodiments.

Referring now to FIGS. 2(a), 2(b) and 2(c), a network implementation 2000 of a system 200 for measuring a quantity of a material and communicating the quantity of the material to a server is illustrated, in accordance with an embodiment of the present subject matter. In one embodiment, the system 200 provides a measurement of the quantity of the fluid by considering one or more error causing parameters. These error causing parameters are compensated by using one or more correction methodology. The values with respect to the quantity of the material are then measured and communicated to the server. The server further transmits an informative message to the system 200. The informative message provides assistance in management of the material inside the container.

Although the present subject matter is explained by considering a scenario that the system 200 is implemented as an application on a server. It may be understood that the system 200 may also be implemented in a variety of computing systems, such as a laptop computer, a desktop computer, a notebook, a workstation, a mainframe computer, a server, a network server, and the like. It will be understood that the system 200 may be accessed by multiple users through one or more user devices 204-1, 204-2 . . . 204-N, collectively referred to as user 204 hereinafter, or applications residing on the user devices 204. Examples of the user devices 204 may include, but are not limited to, a portable computer, a personal digital assistant, a handheld device, and a workstation. The user devices 204 are communicatively coupled to the system 200 through a network 201.

In one implementation, the network 201 may be a wireless network, a wired network or a combination thereof. The network 201 can be implemented as one of the different types of networks, such as intranet, local area network (LAN), wide area network (WAN), the internet, and the like. The network 201 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Referring now to FIG. 2(c), the system 200 is illustrated in accordance with an embodiment of the present subject matter. In one embodiment, the system 200 may include at least one processor 106, an input/output (I/O) interface 114, and a memory 107. The at least one processor 106 may be implemented as one or more microprocessors, microcomputers, microcontrollers, digital signal processors, central processing units, state machines, logic circuitries, and/or any devices that manipulate signals based on operational instructions. Among other capabilities, the at least one processor 106 is configured to fetch and execute computer-readable instructions stored in the memory 107.

The I/O interface 114 may include a variety of software and hardware interfaces, for example, a web interface, a graphical user interface, and the like. The I/O interface 114 may allow the system 200 to interact with a user directly or through the client devices 104. Further, the I/O interface 114 may enable the system 200 to communicate with other computing devices, such as web servers and external data servers (not shown). The I/O interface 114 can facilitate multiple communications within a wide variety of networks and protocol types, including wired networks, for example, LAN, cable, etc., and wireless networks, such as WLAN, cellular, or satellite. The I/O interface 214 may include one or more ports for connecting a number of devices to one another or to another server.

The memory 107 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 107 may include modules 105 and data 124.

The modules 105 include routines, programs, objects, components, data structures, etc., which perform particular tasks or implement particular abstract data types. In one implementation, the modules 105 may include a correction module 108 and other modules 120. The other modules 120 may include programs or coded instructions that supplement applications and functions of the system 200.

The data 124, amongst other things, serves as a repository for storing data processed, received, and generated by one or more of the modules 120. The data 124 may also include a system database 126 and other data 128.

Figure 7:
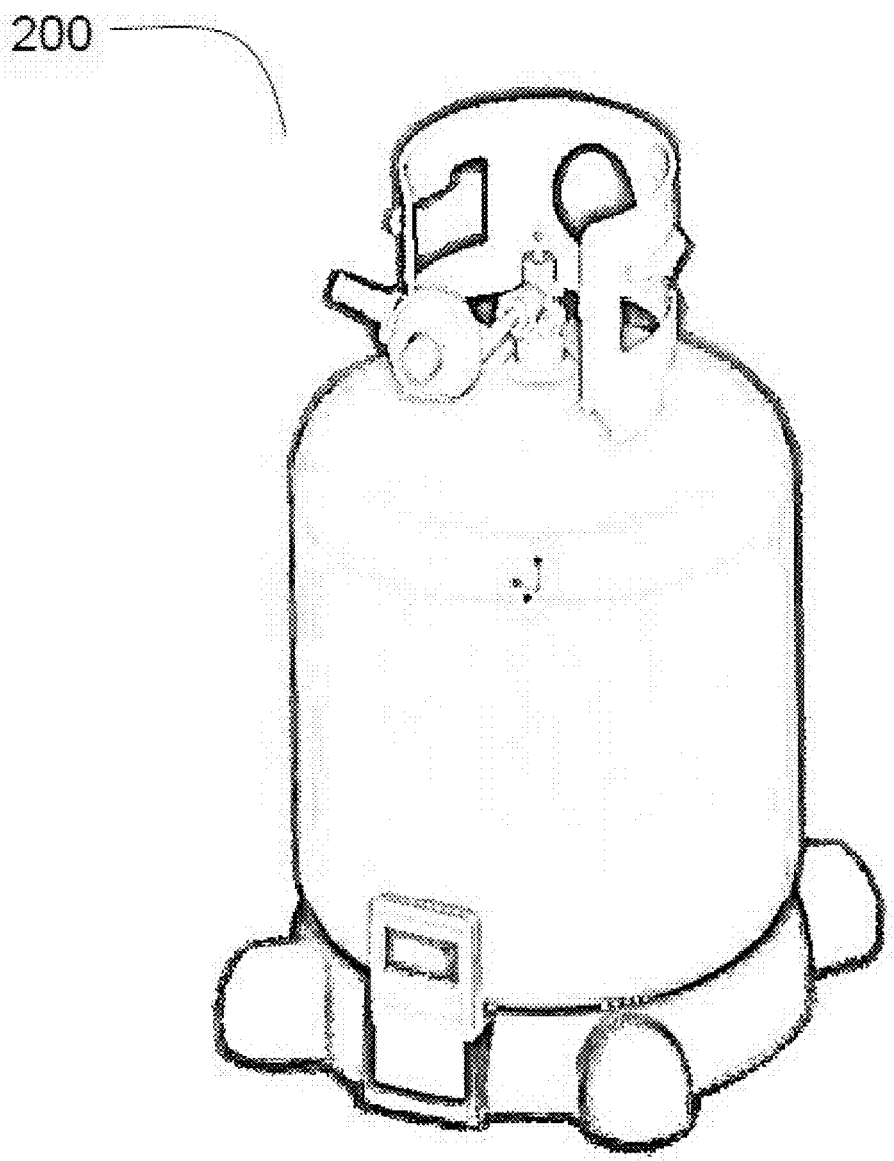
FIG. 7 illustrates a means of holding the container storing the material in accordance with some embodiments.

In one embodiment, as illustrated in FIG. 1, in the apparatus 100, the load bearing platform 102 holds a container storing the material. The load bearing platform 102 may include a weighing scale. Further, the apparatus 100 may comprise a trolley (FIG. 7) coupled to the load bearing platform 102. The trolley may serve as a holder, seater, etc. The trolley may hold the container storing the material over long period of time. The trolley may facilitate in moving the load bearing platform one place to another in domestic homes or any other areas.

In one embodiment, the load bearing platform 102 may be placed on a spring member. The load bearing platform 102 may be coupled to a dial marked with an indicator to determined quantity. The load bearing platform 102 may be coupled to the dial using one or more gears, and/or one or more mechanisms for translating linear displacement into angular displacement. With the coupling, displacement in the load bearing platform 102 due to the quantity of the material it may cause the dial to turn by a certain angular amount. If the dial is accurately calibrated to the spring, then the indicator showing through the viewing window corresponds to the quantity of the material.

In one embodiment, the load bearing platform 102 comprises a lever, a gear assembly, or other means to step down the force placed by the quantity on the spring. For example, one end of a lever arm may be at a fulcrum, the other end of the lever arm may be coupled to the spring, and the quantity of the material may be delivered to a point on the lever arm between the two ends. With this, the force of the material is stepped down, with the force reduction greater the closer the quantity of the material is delivered to the fulcrum. In another embodiment, the load bearing platform 102 comprises one or more electronic sensing mechanisms. The quantity of the material may be directed onto a component having electrical properties that changes based on quantity or force applied. The electrical properties may include resistance, conductivity, capacitance, inductance, direction of conductivity, impedance, impedance at certain frequencies, voltage, charge gradient, etc. For example, components may include a load cell, a strain gauge load cell, a hydraulic load cell, piezoelectric load cell, vibrating wire load cell, capacitive load cell, etc.

In one embodiment, the quantity and/or force may be electrically coupled to one or more other electrical components. The components when combined may form a circuit. The circuit may provide an output reading (e.g., a voltage; e.g., a current), which may vary in a known or deterministic way with the quantity of the material placed on the load bearing platform.

In one embodiment, the load bearing platform 102 may include one or more buttons. The buttons may contain various indications or markings in various shapes, colors and sizes, and may be placed in various arrangements. In another embodiment, the buttons are colored for easy identification. Buttons may be electrically and/or mechanically coupled to internal electronics of the load bearing platform 102, such as to an embedded processor 106, and as such may provide signals to internal electronics.

In one embodiment, the load bearing platform 102 may comprise a reset button. For example, the reset button may be marked "RESET". The reset button may be colored red. In operation, the user may press the reset button once before the placement of a new container on the load bearing platform. The reset button may erase prior data, such as prior quantity measurements of partially filled or empty containers.

In one embodiment, the load bearing platform may comprise on/off button. The on/off button may be marked "ON/OFF", for example. The on/off button may be the color orange. The on/off button may be used, for example, to power off the load bearing platform 102 when not in use, so as to save energy and/or battery life.

In one embodiment, the load bearing platform comprises a % button, when pressed, causes the load bearing platform to show one or more material quantity in percentage, material quantity in kgs, material quantity in lbs, and graphic display of a container with the quantity of material left in the container. As will be appreciated, in various embodiments, the display may show various other messages or similar messages in different forms. For example, the display may show a weight in ounces, a volume remaining, and estimated amount of equivalent barbeque time remaining from the stored material and so on. The % button may be marked "GAS", or may have any other suitable marking.

The % button may be colored green, or any other suitable color. In other embodiments, the electronics contained within the load bearing platform may be powered by a CR 2032 button cell. The CR 2032 button cell may be sufficient to power the load bearing quantity for up to a year. In another embodiment; other sources of power may also be used.

Figure 3:
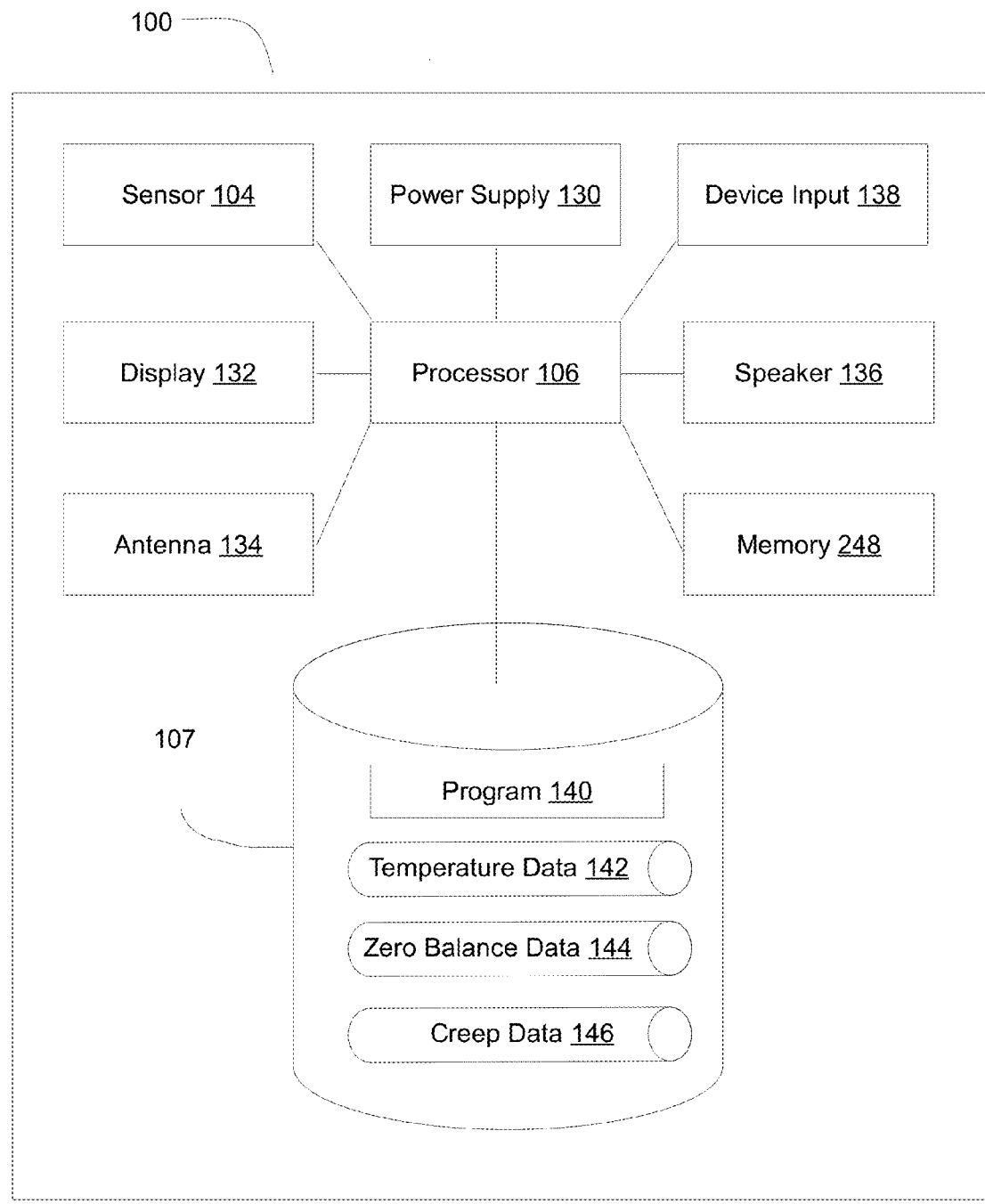
FIG. 3 illustrates a mechanism of measuring quantity of the material in accordance with some embodiments.

In one embodiment, referring to FIG. 3, the apparatus 100 comprises the sensor 104 coupled to the load bearing platform 102. The sensor 104 may also be located inside the load bearing platform 102. The sensor 102 may be configured to measure the quantity of the material and one or more error causing parameters. The processor 106 in communication with the sensors is configured to determine an effect of the error causing parameters while measuring the quantity of the material by executing one or more modules stored in the memory 107. The sensors 104 used to measure the quantity of the material may comprise load sensor, pressure sensor, motion sensors, accelerometers, gyroscopes, location sensor, vibration sensor, or a combination thereof. It is apparent to those skilled in the art to use more or fewer load sensors and that mechanical load sensor or other types of load sensors to measure the quantity of the material.

In one embodiment, the modules may comprise the correction module (108) stored in the memory 107, configured to execute one or more correction methodology with respect to the error causing parameters so measured in order to determine a correction output. The correction methodology determines a variance caused due to the error causing parameter in the measurement of the quantity of the material. The correction module 108 compensates for the error causing parameters such as creep, zero balance, and temperature and cylinder variance. The execution of the correction module with respect to the error causing parameter is presented below.

Measurement of Creep Value as the Error Causing Parameter

The error may be caused due to creep in the container material due to prolonged stress and may be due to high temperatures. Creep may cause the container materials to gradually deform and may not allow the container to regain its original shape. In the load bearing platform 102, the deformation may lead to change in the values of the quantity of the fuel while measuring, thereby presenting inaccurate measurement of quantity of the material when the errors are not compensated. Further, the cause for creep may be due to the usage of the container for prolonged period of time.

In one embodiment, the correction module 108 compensates for creep based on the creep stability after a given period of time. For example, when a new container is placed on the load bearing platform, the quantity of the material may be measured at predefined intervals. Further, the correction module 108 may determine trend in the measurement of quantity of the material and may interpolate final creep value after predefined period of time. In another embodiment, the measurement of the quantity of the material may be taken periodically until there is no longer any change is required in the measurement. In such scenarios, the creep adjustment may be determined based on difference between initial quantity of the material and the quantity of the material after the creep is stabilized.

Measurement of Zero Balance Value as the Error Causing Parameter

In one embodiment, the apparatus 100 may continuously monitor the quantity of the container. Further, the load bearing platform 102 may not have to calibrate before providing measurement. In other embodiment, the load bearing platform 102 may not calibrate to zero load before providing measurement. In order to provide accurate measurement, the providing measurement may store calibration values due to scenarios: (1) at factory during zero load calibration process; (2) at user location during a zero load instance.

The load bearing platform 102 may also be calibrated at various temperatures. The values of the sensor output and temperature may be stored in the memory 107. The data stored in the memory 107 may be retrieved at later stage for calculating the actual quantity of the material. For example, the load bearing platform 102 may use calibrated data stored earlier in order to adjust measured quantity of the material in view of the temperature. In other embodiment, the user may temporarily remove the quantity of the container from the load bearing platform 102 to calibrate the load bearing platform 102 without any load. The user may calibrate the load bearing platform 102 by tapping the load bearing platform, for example, by setting the load bearing platform 102 a set period of time (e.g., 5 seconds) to calibrate.

Measurement of Temperature Value as the Error Causing Parameter

In one embodiment, temperature may bring change in the measured quantity of the material. The load bearing platform 102 may be not recalibrated before measuring such that the effect of temperature may be compensated by the correction module 108. The load bearing platform 102 may comprise an inbuilt thermometer, temperature sensor, or the like. Further, the load bearing platform 102 may receive external temperature measurements via a wirelessly coupled thermometer or via a weather data feed.

For example, the load sensor may comprise temperature characteristic: 0.25 (% F.S/10 C). The correction module 108 compensates the measured quantity based on predefined constant, factor, and the factors dependent on temperature, and factors dependent on the quantity.

In one embodiment, the temperature effect on the measurement may be compensated: (1) at the time of factory calibration or zero load instance calibration, the temperature may be stored in non-volatile memory; (2) at the time of measuring quantity, the temperature is may also be measured; (3) measured load quantity may be adjusted by 0.25*% F.S*(Current Temperature−Calibration Temperature)/10.

As will be appreciated, other methods of measuring temperature and compensating for temperature in a quantity measurement may be used. Further, various processes that measure temperature, in conjunction with the quantity and uses any correction methodology to adjust the effect of temperature is well understood by those persons skilled in the art.

Measurement of Tank Variance Value as the Error Causing Parameter

In one embodiment, the correction module 108 may be used to account for material tank variance. For example, suppose there are two types of gas tanks available weighing 18 lbs and 16.7 lbs respectively. It may be desirable for the correction module 108 to avoid presenting a false positive, i.e., the correction module 108 may avoid indicating that the gas in the container when there is no gas left in the container. In order to overcome such scenario, the correction module 108 may implement the following methodology:

(1) factory default assumes that container minimum quantity is 18 lbs.

(2) the quantity is used for calculating percent and time remaining.

(3) when the container reaches calculated minimum, the display is 0%/0 minutes.

(4) the minimum container quantity is continuously recorded at 1 minute intervals (5) the new minimum quantity is stored in memory if it stays the same for 5 measurements and if it is lower than the current stored minimum (6) the new tank maximum quantity is calculated, which is calculated at minimum plus 15 lbs (7) the new recorded minimum quantity is used in all new calculations;

(8) stored maximum quantity is compared with actual quantity when container is replaced—if measured maximum is larger than recorded then restore minimum container maximum container values back to factory default (18 lbs and 33 lbs) back to 18 lbs and maximum container quantity back to 33 lbs if maximum quantity.

In one embodiment, the apparatus 100 further comprises the measurement device 110 communicating with the processor 106 and is configured to measure periodically one or more values associated with the quantity of the material by using the correction output. The measurement device 110 further comprises one or more electronic components to convert electrical signals into weight of the material. The electronic components is selected from a group of a load cell, a strain gauge load cell, a hydraulic load cell, piezoelectric load cell, vibrating wire load cell, pressure gauge or a capacitive load cell. The electrical properties may include resistance, conductivity, capacitance, inductance, direction of conductivity, impedance, impedance at certain frequencies, voltage, charge gradient, etc.

In one embodiment, the apparatus 100 further comprises the output device 112 configured to display one or more values associated with the quantity of the material and to generate a notification for a user in a customized manner. As will be appreciated, in various embodiments, the display working as an output device 112 may show various other messages or similar messages in different forms. For example, the display may show a weight in ounces, a volume remaining, and estimated amount of equivalent barbeque time remaining from the stored material and so on. The output device may be a liquid crystal display (LCD), electronic ink (e-ink) display, or any other type of display.

The values associated with quantity of the material that may be displayed comprises weight readings of the material, estimates of an amount of material remaining, a material weight in percentage, a material weight in kgs, material quantity in lbs. The output device 112 further displays one or more values in a form of a graphical representation to further generate notification in a form of an alarm or any light display, or a combination thereof.

In one embodiment, the output device 112 may be connected to the load bearing platform 102 via a wire, cable, Ethernet cable, or any other means of communication. In one embodiment, the load bearing platform 102 may communicate with the display wirelessly, e.g., via Bluetooth, Wi-Fi, or any other protocol. The output device 112 may also be present inside the load bearing platform 102.

Battery Life Optimization

In one embodiment, optimization of the battery life of the one or more components used in the apparatus 100 is done by means of the battery optimization module 116. The components present the apparatus 100 may be set into sleep mode at the times when the measurements are taken periodically or when the user presses the button. The sleep mode may include mode of reduced power consumption where less or minimal circuitry is used, or when particularly calculation module are implemented.

In one embodiment, the load bearing platform 102 may track any interactions with the user. For example, the load bearing platform 102 may track any motions of the load bearing platform 102, jostling of the load bearing platform, placement of materials on the load bearing platform 102, or removal of materials from the load bearing platform 102. In order to implement the tracking, the load bearing platform 102 may utilize motion sensors, accelerometers, gyroscopes, location sensor, vibration sensors, or any other suitable sensor means.

In one embodiment, interactions with the user may trigger the load bearing platform 102 to awaken from sleep mode. In one embodiment, lack of interaction with the user (e.g., lack of interaction for 20 seconds) may cause the load bearing platform 102 to return to sleep mode.

In one embodiment, the load bearing platform 102 may track interactions so as to track probable usage of Gas. For example, if the detected quantity of a Gas canister is reduced after the load bearing platform 102 detects a removal and subsequent replacement of the container, then the load bearing platform 102 may infer that the Gas has been used. However, if the detected quantity of the Gas canister is reduced even in the absence of a detected interaction, then the load bearing platform 102 may determine that there is gas leakage, or that there is some source of measurement error. In the case of a determined gas leakage, the load bearing platform 102 may provide alert or other notification, such as sounding an alarm, displaying a message, transmitting a wireless signal, sending a text message, sending an email, alerting a fire department, or the load bearing platform 102 may take any other reactive measure. In the case of a determined measurement error, the load bearing platform 102 triggers the correction module 108 to compensate for the error causing parameters.

In one embodiment, the period of the quantity measurements taken may vary based on the amount of Gas remaining, based on the percent fullness of a canister, based on the detected weight of an object, or based on any other factor. In other embodiments, a frequency of measurements taken may vary as follows:
- if a canister is greater than 25% full, then measurements are taken only when the user presses a button;
- if a canister is between 5% and 25% full, then measurements are taken every five minutes if a panel is plugged in (e.g., if a display panel is plugged in);
- if a canister is less than 5% full, then measurements are taken every minute if a panel is plugged in. For example, the user may receive a more granular updates as to the quantity of Gas remaining as the user gets closer to running out of Gas. The user may then be less likely to run out and be caught unawares.

As will be appreciated, various other methods may be used to vary the frequency of measurement. For example, other frequencies of measurement may be used, and other capacity thresholds may be used before changing from one frequency of measurement to another.

The apparatus 100 further comprises the interface 114 to allow a user to store pre-determined values in the memory 107. The predetermined values are used by the processor while measuring the quantity of the material.

Still referring to FIG. 3, the apparatus 100 and system 200 are provided with a power supply 130. The processor 106 is provided with a device input 138 to store data in the memory 107. The apparatus 100 and system 200 are provided with a speaker 136 to generate alarms and alerts. An antenna 134 works as the transreceiver 118. The display 132 displays the measurement of quantity of the material. Program 140 applies correction methodologies for temperature data 142, zero balance data 144 and creep data 146.

Referring to FIGS. 2(*a*), 2(*b*) and 2(*c*), in one embodiment, a system 200 for measuring a quantity of a material is provided. The quantity of the material is communicated to a server 122 in the network 201. The system 200 comprises a load bearing platform 102, sensors 104 and processor 106 coupled to the memory 107. The memory stores a correction module 108. The system 200 comprises a measurement device 110, output device 112, a user interface 114 and a battery optimization module 116. The system 200 further comprises a transceiver 118 configured to transmit the values associated with the quantity of the material to the server 122 in the network 201. The transceiver 118 is further configured to receive one or more informative message from the server 122 with respect to the values transmitted to the server, such that the informative message provides assistance in management of the material in the container.

The working and description of the load bearing platform 102, the sensors 104, the processor 106, the measurement device 110, the output device 112, the user interface 114 and the battery optimization module 116 is similar to as described for apparatus 100.

The transceiver 118 further communicates with the server 122 by means of a Bluetooth, a wifi, an ethernet port, any wireless communication module, any wired communication module, or a combination thereof. Further, the transceiver 118 communicates with the server through a communication device 120 by using a short range communication protocol by using a customized application to be used in android, smart phones etc. The communication device 120 further comprises a smart phone, custom embedded electronics, and portable battery operated devices.

In one embodiment, the informative message that the transceiver 118 receives from the server 122 may comprises a message regarding refilling of the material in the container, regarding change or maintenance of the container, regarding acknowledgment with respect to the user input, consumption of gas for a given size of the family, consumption of the gas for a season, consumption of gas for a specific geography, consumption to be tracked for hours or time of the day, or a combination thereof. The informative message may be further communicated over telecommunication network like telephony, mobile networks etc.

In one embodiment, the communication device 120 may be a MODEM which receives the informative message from the server or any other device for either sending the data to server's, cloud storage of data, sending text messages to book the new cylinder, auto dial the gas agency to book the new gas cylinder etc.

Figure 4:
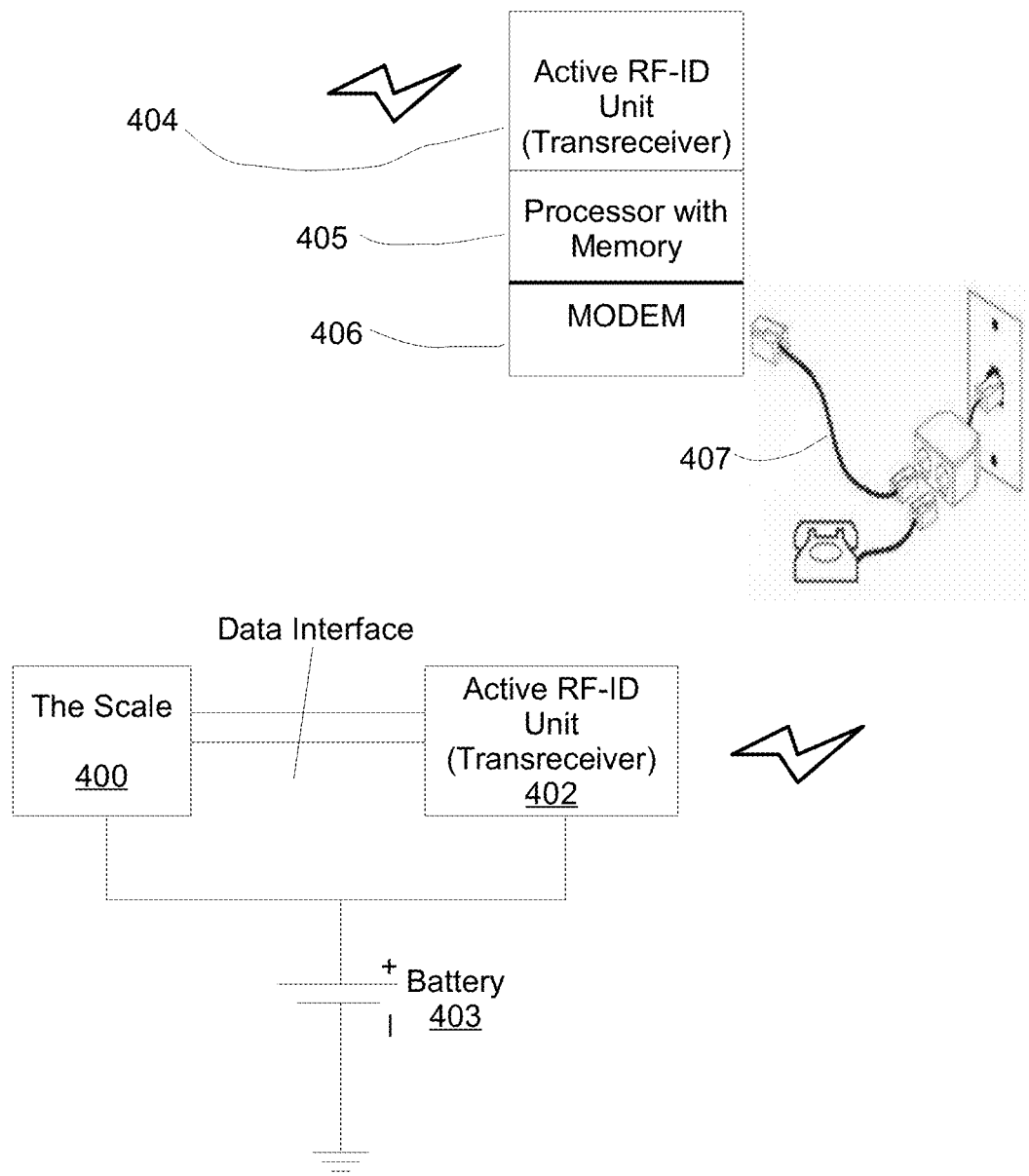
FIG. 4 illustrates a mechanism of measuring quantity of the material in accordance with some embodiments.

Referring to FIG. 4, in accordance with an exemplary embodiment, the scale 400 through the data interface transmits the measurement of the material to an active RF-ID Unit Transceiver 402. The processor 405 is used to compensate errors. Through a modem 406, the measurement of material is transmitted to a communication device 407 for further management of fuel. The communication device 407 transmits the message to one or more server for receiving informative messages.

Figure 5:
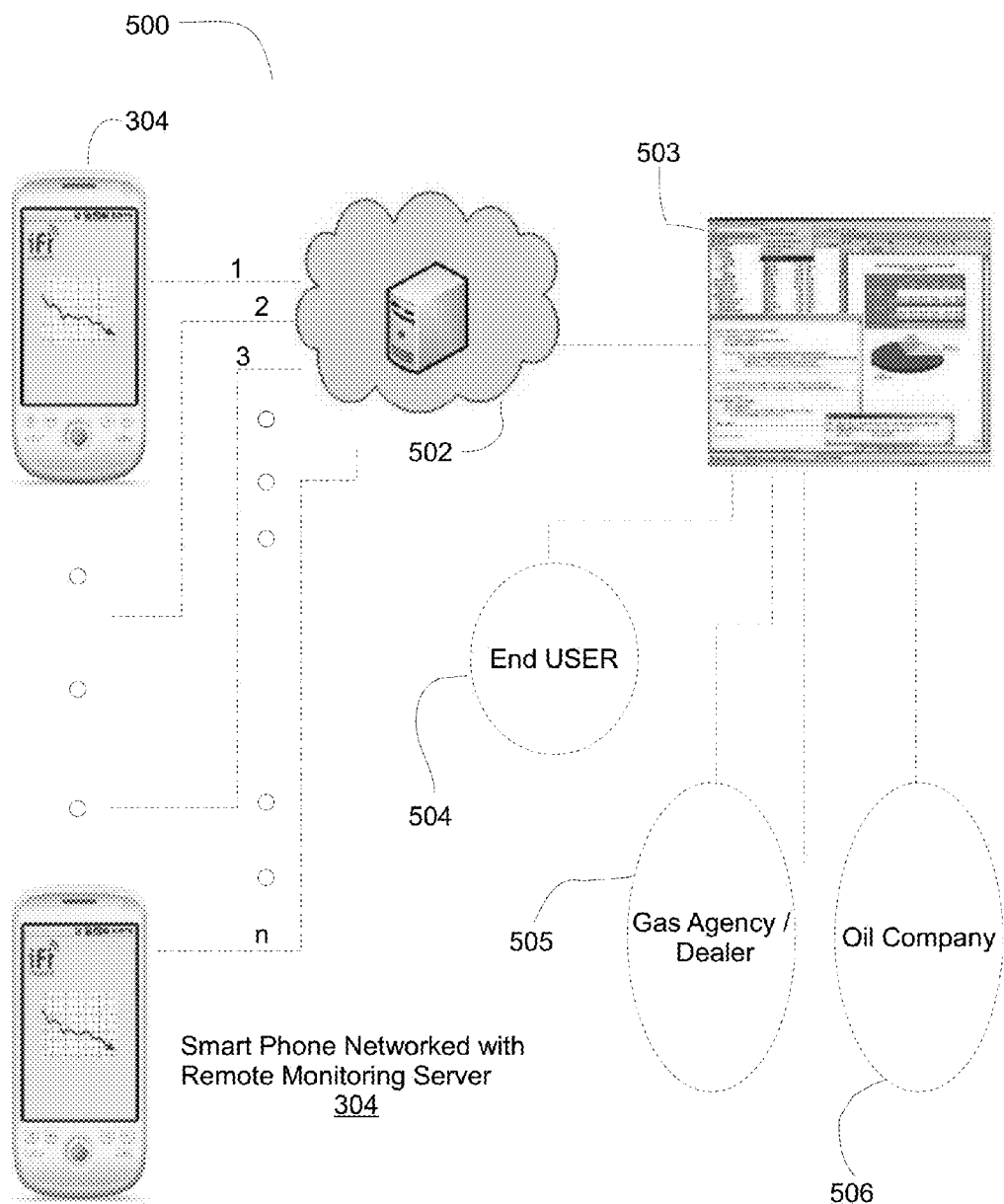
FIG. 5 illustrates a communication of values with the server in accordance with some embodiments.

Referring to FIG. 5, in one embodiment, according to method 500, the load bearing platform 202 may comprises the server 502 connected to the Smartphone for data acquisition and data analytics. The server 502 may be cloud based server or an independent server. The server 502 may receive information of Gas container users using Smartphone as in drawing 304. The server 502 may transmit the information to the users by sending data to the Smart phone using wireless technologies like GPRS, 3G, 4G, Wi-Fi or a combination thereof. The server 502 may consist of interface to the user 504, Dealer 505 and Oil/Gas Company 506.

The server 502 may provide web services like email services and user registration. The server 502 may consist of data bases such as MYSQL, SQL or any other database. Further, the server may consist of services of Apace, Tomcat, JDK or any other services. The services may be hosted on an individual server or Cloud based server. The server may have the user interface based on HTML, XHTML or any other languages for viewing the information on a webpage. The Users may register on the webpage with unique user id and password by using the smart phone 304 networked with remote monitoring server. Various trends may be displayed by an application 503 on display of server 502. The application 503 may be used to connect to end user 504, gas agency 505 or Oil Company 506.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented in the above described media system 102.

Figure 6:
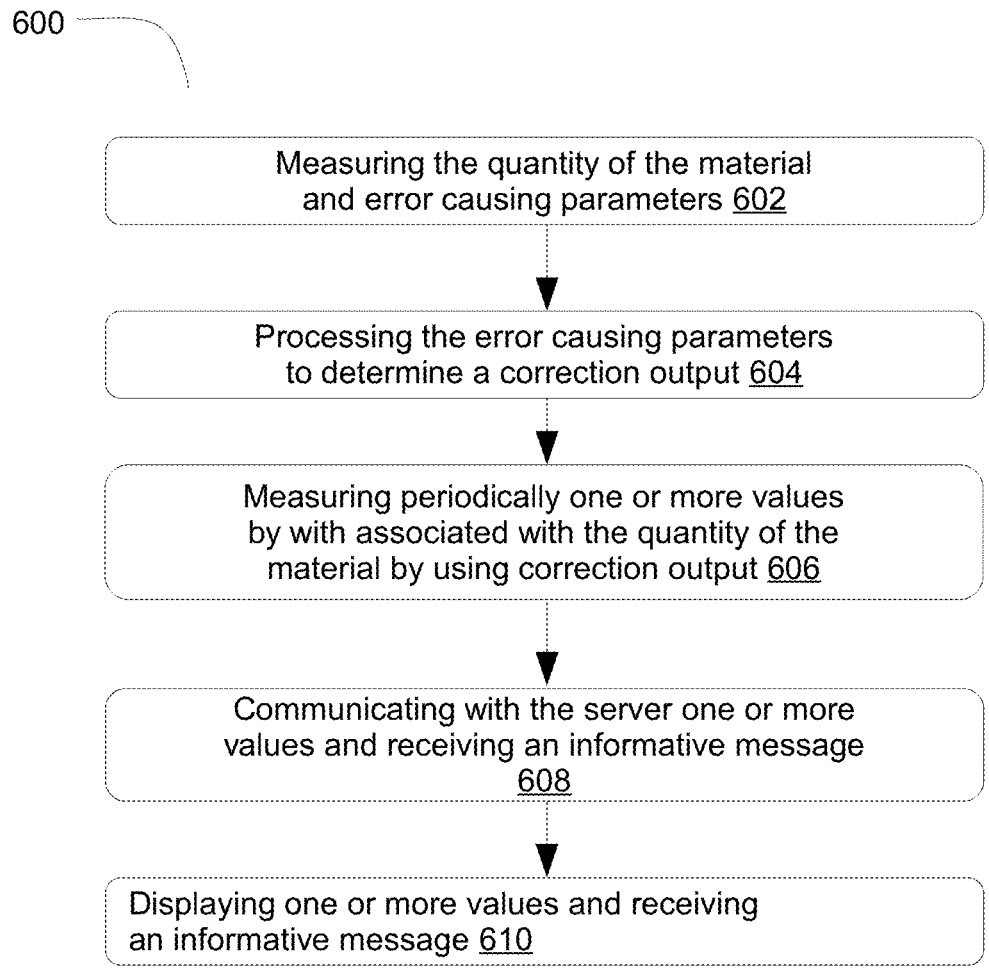
FIG. 6 illustrates a method of measuring quantity of the material and sharing the quantity of the server in accordance with some embodiments.

At block 602, the quantity of the material and one or more error causing parameters in the measurement of the material are measures as shown FIG. 6.

At block 604, one or more correction methodologies are executed with respect to the error causing parameters to determine a correction output. The correction methodology determines a variance caused due to the error causing parameter in the measurement of the quantity of the material.

At block 606, measuring periodically one or more values associated with the quantity of the material by using the correction output.

At block 608, communicating with the server to transmit one or more values associated with the quantity of the material and to receive one or more informative message from the server with respect to the values so transmitted to the server. The one or more values and informative message are then displayed to the user.

The foregoing embodiments are not intended to be exhaustive or to limit the disclosure to the precise forms disclosed, and modifications and variations are also contemplated as falling within the present scope.

Various embodiments may advantageously show trends on propane gas levels inside the cylinder so that a user can plan stock or arrange back-up or additional cylinder for uninterrupted use.

Various embodiments may advantageously show gas consumption patterns over period of time.

Various embodiments may advantageously show trends on daily consumption patterns.

Various embodiments may advantageously integrate software tools and advisory tips on how to use gas efficiently based on user patterns.

Various embodiments may advantageously show allow data collection on user locations, their lifestyles, their likings, shopping patterns etc.

EMBODIMENTS

The following are embodiments, not claims:

Z. An apparatus for measuring quantity of a material, the apparatus comprising:
  a load bearing platform to hold a container storing the material;
  at least one sensor coupled to the load bearing platform, configured to measure the quantity of the material and one or more error causing parameters;
  a processor in communication with the sensors, coupled to a memory, the processor configured to determine an effect of the error causing parameters while measuring the quantity of the material by executing one or more modules stored in the memory, the one or more modules further comprising:
  a correction module configured to execute one or more correction methodology with respect to the error causing parameters so measured, to determine a correction output, the correction methodology determines a variance caused due to the error causing parameter in the measurement of the quantity of the material;
  a measurement device configured to measure periodically one or more values associated with the quantity of the material by using the correction output; and
  an output device configured to display one or more values associated with the quantity of the material and to generate a notification for a user in a customized manner.

B. The apparatus of embodiment Z, wherein the material may include LPG (Liquid Petroleum Gas).

C. The apparatus of embodiment Z, wherein the sensors further comprises load sensor, pressure sensor, motion sensors, accelerometers, gyroscopes, location sensor, vibration sensor, or a combination thereof.

D. The apparatus of embodiment Z, wherein the error causing parameters further comprises a creep value, a zero balance factor, a temperature factor, a tank variance factor or a combination thereof.

E. The apparatus of embodiment Z further comprises a user interface configured to allow a user to store in the memory, one or more predetermined values affecting the measurement of the quantity of the material, the predetermined values to be used by the processor while determining the correction output.

F. The apparatus of embodiment Z, further comprises a battery optimization module to conserve the battery used to charge the apparatus.

G. The apparatus of embodiment Z, wherein the measurement device further comprises electronic components to convert electrical signals into weight of the material, the electronic components is selected from a group of a load cell, a strain gauge load cell, a hydraulic load cell, piezoelectric load cell, vibrating wire load cell, pressure gauge or a capacitive load cell.

H. The apparatus of embodiment Z, wherein the values associated with quantity of the material comprises weight readings of the material, estimates of an amount of material remaining, a material weight in percentage, a material weight in kgs, material weight in lbs, a graphic display of a container with the volume of the material left in the container or any other message.

I. The apparatus of embodiment Z, wherein the output device further displays one or more values in a form of a graphical representation to further generate notification in a form of an alarm or any light display, or a combination thereof.

J. A system for measuring a quantity of a material, the quantity of the material is further communicated to a server in a network, the system comprising:
  a load bearing platform to hold a container storing the material;
  at least one sensor coupled to the load bearing platform, configured to measure the quantity of the material and one or more error causing parameters in the measurement of the quantity of the material;
  a processor in communication with at the sensors and coupled to a memory, the processor configured to determine an effect of the error causing parameters while measuring the quantity of the material by executing one or more modules stored in the memory, the one or more modules further comprising:
    a correction module configured to execute one or more correction methodology with respect to the error causing parameters to determine a correction output, the correction methodology determines a variance caused due to the error causing parameter in the measurement of the quantity of the material;
    a measurement device configured to measure periodically one or more values associated with the quantity of the material by using the correction output;
    a transreceiver configured to transmit the values associated with the quantity of the material to the server in the network, the transreceiver is further configured to receive one or more informative message from the server with respect to the values transmitted to the server, such that the informative message provide assistance in management of the material in the container; and
    an output device configured to display one or more values associated with the material and the informative message to generate a notification for a user in a customized manner.

K. The system of embodiment J, wherein the transreceiver further communicates with the server by means of a Bluetooth, a wifi, an ethernet port, any wireless communication module, any wired communication module, or a combination thereof.

L. The system of embodiment J, wherein the transreceiver communicates with the server through a communication device by using a short range communication protocol by using a customized application.

M. The system of embodiment L, wherein the communication device further comprises a smart phone, custom embedded electronics, portable battery operated devices.

N. The system of embodiment J, wherein the informative message further comprises a message regarding refilling of the material in the container, regarding change or maintenance of the container, regarding acknowledgement with respect to the user input, consumption of gas for a given size of the family, consumption of the gas for a season, consumption of gas for a specific geography, consumption to be tracked for hours or time of the day, or a combination thereof.

O. A method for measuring a quantity of a material, the quantity of the material is further communicated to a server in a network, the method comprising:
  measuring the quantity of the material and one or more error causing parameters in the measurement of the material;
  processing the error causing parameters to determine an effect of the error causing parameters while measuring the quantity of the material, the processing further comprising:
    executing one or more correction methodology with respect to the error causing parameters to determine a correction output, the correction methodology determines a variance caused due to the error causing parameter in the measurement of the quantity of the material;
  measuring periodically one or more values associated with the quantity of the material by using the correction output;
  communicating with the server to transmit one or more values associated with the quantity of the material and to receive one or more informative message from the server with respect to the values so transmitted to the server, such that the informative message provide assistance in the management of the material in the container; and displaying one or more values associated with the material and the informative message to a user in a customized manner.

P. The method of embodiment O, wherein the error causing parameters further comprises a creep value, a zero balance factor, a temperature factor, a tank variance factor or a combination thereof.

Q. The method of embodiment O, wherein the correction methodology with respect to a creep value obtained as the error causing parameter further comprises determining a trend in the measurement of the quantity of the material and interpolating a final creep value after a fixed period of time, the correction methodology with respect to a zero balance value obtained as the error causing parameter further comprises storing and retrieving a pre-determined calibration data to adjust the measured quantity of the material, the correction methodology with respect to a temperature value obtained as the error causing parameter further comprises adjusting the measured quantity of the material by executing one or more temperature and weight dependent formula, and the correction methodology with respect to a tank variance value obtained as the error causing parameter further comprises calculating a percent of the material and time remaining by using a default minimum tank weight.

R. The method of embodiment O, wherein measuring the quantity of the material further comprises converting electrical signals into the quantity of the material.

S. The method of embodiment O further comprises allowing a user to store in the memory, one or more predetermined values affecting the measurement of the quantity of the material, the predetermined values to be used by the processor while determining the correction output.

T. The method of embodiment O, wherein one or more values are illustrated the form of a graphical representation to further generate notification in the form of an alarm or any light display, or a combination thereof.

A. An apparatus comprising:
a load-bearing platform for holding a container with material;
a first sensor coupled to the platform, wherein the first sensor is configured to generate readings that vary with load placed on the platform;
a second sensor configured to measure an ambient condition;
a communications port;
a memory operable to store a set of computer instructions; and
a processor operable to execute the computer instructions to:
receive a first reading from the first sensor;
receive a second reading from the second sensor;
determine a first quantity of a first material that has been placed on the platform based on the first reading and based on the second reading; and
cause an indication of the first quantity to be transmitted to an external entity via the communications port.

E. The apparatus of embodiment A further comprising a user interface configured to allow a user to store in the memory, one or more predetermined values affecting the determination of the first quantity; in which, in determining the first quantity, the processor is operable to determine the first quantity of the first material based on the first reading, the second reading, and the one or more predetermined values.

F. The apparatus of embodiment A, further comprising:
a battery; and
a battery optimization module to conserve the battery used to charge the apparatus.

G. The apparatus of embodiment A, wherein the first sensor is one of: a load cell, a strain gauge load cell, a hydraulic load cell, a piezoelectric load cell, a vibrating wire load cell, a pressure gauge, and a capacitive load cell.

A.5 The apparatus of embodiment A further including guard members configured to hold in place on the platform a container of liquid or gaseous fuel.

A.0 The apparatus of embodiment A in which the second reading is one of: (a) a creep value; (b) a zero-balance factor; (c) a temperature factor; and (d) a tank variance factor.

A.4 The apparatus of embodiment A in which, in determining the first quantity of the first material, the processor is further operable to:
determine a tentative quantity based on the first reading;
determine an error based on the second reading; and
adjust the tentative quantity by the amount of the error in order to arrive at the first quantity.

A.4.1 The apparatus of embodiment A.4 in which the memory stores a Calibration Temperature, in which the second reading is a temperature, and in which, in determining the error, the processor is operable to use the formula $0.25*F.S*(\text{Current Temperature}-\text{Calibration Temperature})/10$.

A.4.2 The apparatus of embodiment A.4 in which, in determining the error, the processor is operable to:
determine a trend in measurements of quantity of the material and interpolate a final creep value after a fixed period of time;
store and retrieve predetermined calibration data to adjust the determined first quantity of the material;
adjust the determined first quantity of the material by executing one or more temperature and weight dependent formulas; and
calculate a percent of the material and time remaining by using a predetermined minimum container weight.

A.6. The apparatus of embodiment A in which the external entity is one of: (a) a server; (b) a computing device; and (c) a person.

A.5. The apparatus of embodiment A in which the communications port is one of: (a) a wireless transceiver; (b) an ethernet port; (c) a cellular transceiver; (d) a Wi-Fi transceiver; and (e) a Bluetooth transceiver.

A.1 The apparatus of embodiment A where in the second sensor is configured to measure an ambient temperature.

A.2 The apparatus of embodiment A further comprising a display, in which the processor is further operable to cause the display to show the indication of the quantity.

A.6 The apparatus of embodiment A in which the processor is further operable to:
receive a third reading from the first sensor at a time later than a time of the first reading;
receive a fourth reading from the second sensor at a time later than a time of the second reading;
determine a second quantity of the first material based on the third reading and based on the fourth reading; and
cause an indication of the second quantity to to be transmitted to an external entity via the communications port.

A.6.1 The apparatus of embodiment A.6, further comprising an output device, in which the processor is further operable to:
determine a difference between the second quantity and the first quantity;

determine a rate of material depletion based on the difference between the second quantity and the first quantity, and based on the elapsed time between the time of the third reading and the time of the first reading;

determine a fifth time at which the material will be fully depleted; and cause an indication of the fifth time to be shown on the output device.

A.6.2. The apparatus of embodiment A.6, further comprising an output device, in which the processor is further operable to:

determine a difference between the second quantity and the first quantity;

determine a rate of material depletion based on the difference between the second quantity and the first quantity, and based on the elapsed time between the time of the third reading and the time of the first reading;

determine a fifth time at which the material will be fully depleted; and cause the output device to broadcast an alert if the fifth time is within a predetermined time.

A.6.3. The apparatus of embodiment A.6, further comprising an output device, in which the processor is further operable to:

determine a difference between the second quantity and the first quantity;

determine a rate of material depletion based on the difference between the second quantity and the first quantity, and based on the elapsed time between the time of the third reading and the time of the first reading; and cause the output device to display an informative message, the message including one of:

a suggestion to refill the container;

a suggestion to change the container;

a suggestion to perform maintenance on the container;

an indication of material consumption over time;

an indication of the rate of consumption of the material for a family;

an indication of consumption the material for a season;

an indication of consumption of the material for a specific geography;

an indication of when consumption of the material is being tracked.

Acoustic Measurement

In various embodiments, a quantity of material remaining in a tank may be measured using acoustic waves. In various embodiments, a quantity of material remaining in a tank may be measured using ultrasonic waves.

Various embodiments use ultrasonic/acoustic reflections to determine how much material is contained in a tank. The material may be liquid propane gas (LPG), or it may be any other liquid, or any other material. Various descriptions herein may refer to LPG, but it should be understood that LPG is being used as an example and that embodiments are likewise intended to apply to other liquids and to other materials.

Acoustic waves, including those in the ultrasonic (>20 kHz) range, travel as waves of pressure. In order for a pressure wave to travel, a physical medium is required for it to travel through. Many media will propagate acoustic waves, but how quickly and effectively the wave travels depends on the medium, and as a traveling acoustic wave meets a material boundary, some amount of that energy is reflected back in the opposite direction. In an LPG tank, the liquid/gas boundary that exists in the tank causes a traveling acoustic wave to reflect a portion of its energy back towards its original source. This portion of reflected energy may even constitute the majority of the energy in the incident signal.

In various embodiments, a sensor utilizes these basic principles to perform its evaluation of LPG level inside the tank. The sensor may be an ultrasonic sensor or any other suitable sensor.

In various embodiments, a sensor is attached to the bottom of the tank. The sensor may contain an ultrasonic piezoelectric transducer (a "speaker" that generates ultrasonic acoustic waves), or any other suitable components.

The sensor (e.g., transducer of the sensor) may send acoustic waves (e.g., ultrasonic waves; e.g., a pulse of ultrasonic waves) into the tank (e.g., into the bottom of the tank). The waves (e.g., the acoustic pulse) may travel through the material in the tank (e.g., upwards through the liquid propane), and reflects off of the liquid/gas boundary in the tank. The pulse (e.g., a portion of the pulse) may then travels backwards toward the bottom of the tank, and become incident on the sensor after some time.

In various embodiments, the sensor (e.g., the piezoelectric transducer) may work in reverse. In various embodiments, a vibration, such as that caused by an incident acoustic wave, induces an electrical pulse of proportional magnitude on the electrodes of the sensor (e.g., the piezoelectric transducer). Since the speed of sound (acoustic propagation velocity) in LPG is known, by measuring the time between generation of the original pulse and the reception of the reflected pulse (called the "time of flight"), one can determine how far the wave traveled. This is the total round-trip distance from the bottom of the tank to the top level of the liquid inside the tank, i.e., twice the depth of the liquid propane in the tank.

Various embodiments contemplate that the same sensor is used to generate an outgoing signal (e.g., an outgoing acoustic signal) and receive the return signal. In various embodiments, different sensors are used to transmit the outgoing signal and receive the return signal. In various embodiments, different sensor components are used to transmit the outgoing signal and receive the return signal.

In various embodiments, knowing the geometry and nominal full capacity of the tank, the calculated LPG depth can be compared against a known value for a nominally full tank in order to determine a percentage of full capacity remaining in the tank.

As an example, suppose a sensor is placed at the bottom of a cylindrical tank.

Let 'V' be the velocity of acoustic waves in the material of interest (e.g., LPG).

Let 'h' be the current height of the material in the tank.

Let 'H' be the height of the material in the tank when the tank is completely filled.

Let 'A' be the cross-sectional area of the tank.

Let 't' be the measured time of flight of the acoustic wave in the tank.

The percentage of material remaining in the tank, 'P' can then be calculated as follows:

$$P = h/H = vt/(2H)$$

In various embodiments, the percentage of fuel remaining may be calculated directly based on measured time of flight as compared to a known time of flight when the tank is full.

Let 't' be the measured time of flight of the acoustic wave in the tank.

Let '$t_F$' be the known time of flight an acoustic wave in the tank when the tank is full. The percentage of material remaining in the tank, 'P' can then be calculated as follows:

$$P=t/t_F$$

In various embodiments, the volume of material remaining in the tank, 'Q' can be calculated as follows:

$$Q=hA=vtA/2$$

As will be appreciated, this formula may be modified to account for other tank geometries (e.g., for situations where the bottom of the tank is not perfectly flat, where the tank is not a perfect cylinder, etc.). As will be appreciated, this formula may be modified to account for other sensor placements (e.g., where the sensor is not at the bottom of the tank, etc.)

An important consideration in using this method of sensing is that the speed of acoustic propagation through a material—especially a liquid such as LPG—is significantly a function of the density of the medium, which varies with temperature. LPG tanks are often used outdoors where temperatures can vary significantly. Further, as an LPG tank is used, the evaporation of the liquid propane can cause the temperature of the LPG to drop significantly below the ambient temperature (e.g., ambient air temperature). As a result, in various embodiments, the time of flight calculations may compensate for the temperature of the LPG. In various embodiments, the temperature of the material is measured directly, rather than taken from the ambient air.

Thus, in various embodiments, velocity (e.g., of acoustic waves in LPG) is determined or calculated as a function of temperature (e.g., of measured temperature). Accordingly, a percentage of material (e.g., LPG) remaining in a tank, a quantity of material remaining in a tank, etc., may be determined as a function of a temperature. For example, if a measured temperature (e.g., of a material, e.g., of LPG) is designated as T, then the velocity of an acoustic wave in the material may be denoted as v(T). Above formulas may become:

$$P=h/H=v(T)t/(2H)$$

$$Q=hA=v(T)tA/2.$$

In various embodiments, known formulas, approximate formulas, approximations, etc., for the velocity of an acoustic wave as a function of temperature may be used. E.g., formulas for the velocity of an acoustic wave as a function of temperature may be substituted into the above expressions for determining, e.g., the percentage of material remaining, or the quantity of material remaining in a tank. For example, the formula for the velocity of an acoustic wave in a material may be $$v=v_0+bT$$

where '$v_0$' and 'b' are constants, and where b is possibly negative, indicating that the velocity of sound in a material may decrease as temperature increases.

An algorithm according to various embodiments also compensates for the curvature of the shape of the LPG tank base. Since a typical tank is not strictly a cylinder, the use of basic cylindrical volume equations to determine the volume of LPG in the tank may result in volume calculations that have up to 10-12% error compared to the true volume. In various embodiments, a compensation algorithm provides results that are accurate to within a 1-2% for over 90% of tank levels.

Sensor

Figure 8:
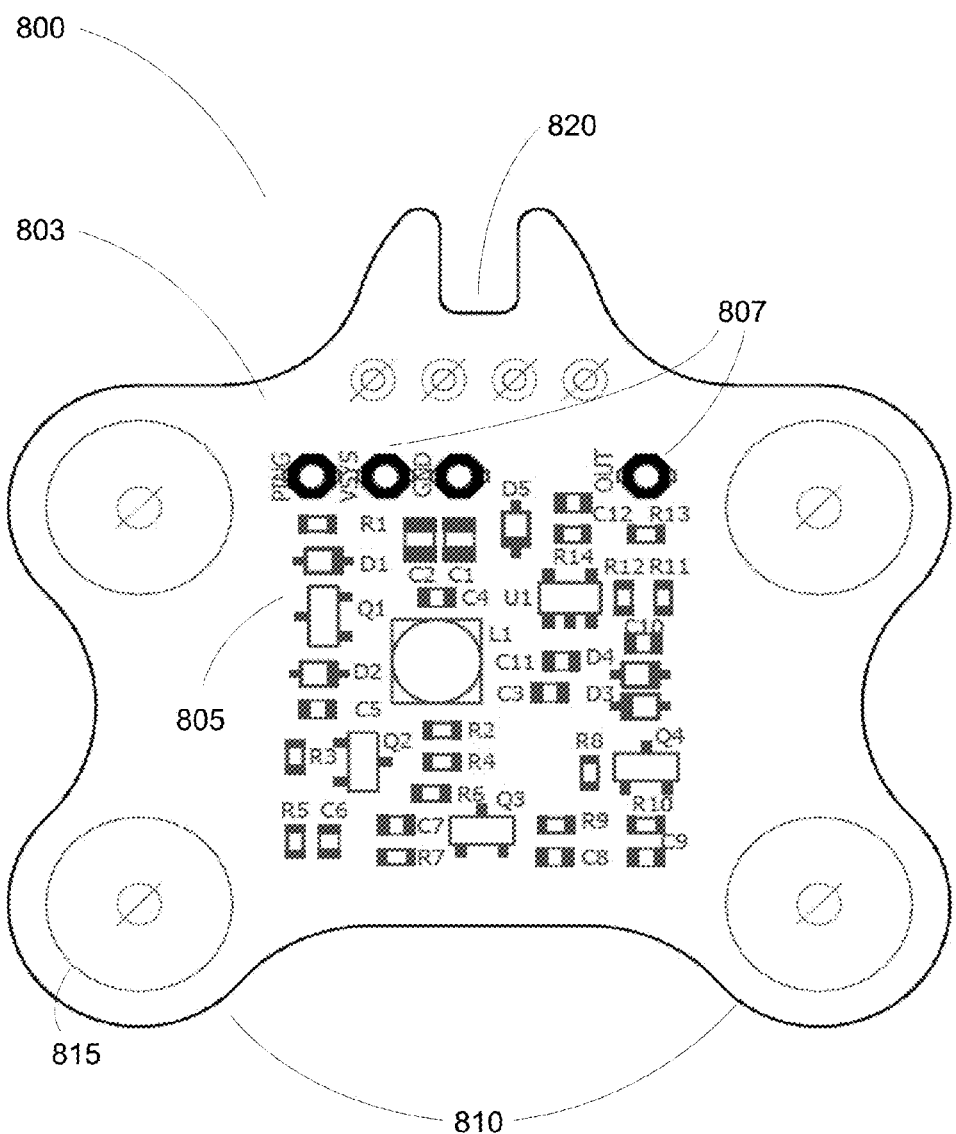
FIG. 8 illustrates a sensor, according to some embodiments.

With reference to FIG. 8, a sensor 800 is show according to various embodiments. The illustrated view is from the top, according to some embodiments. The sensor may include a housing, chassis, body, or the like 803. The housing 803 may be a flexible material so that the sensor can be conformed to a surface of a tank (e.g., fuel tank), where such surface may not necessarily be flat. For example, a sensor may be conformable to a concave or recessed portion at the bottom of a tank. The housing may be made or rubber, flexible plastic, or of any other suitable material. In various embodiments, the housing may be semi-rigid, rigid, or of any other construction.

Sensor 800 may include circuitry, electronics, or the like 805. Electronics 805 may include a controller, piezo electric transducer, and any other suitable electronics. FIG. 8 depicts illustrative circuitry, where and "R" denotes a resistor, "C" denotes a capacitor, "D" denotes a diode, and "Q" denotes an emitter of a transistor, and "U" denote an operational amplifier. Also illustrated are interface points (e.g., 807) from the sensor to any external device or circuitry. For example, the point labeled "OUT" represents a point at which the sensor transmits an output signal to any attached external device or circuitry. Similarly, "VSYS" and "GND" represent interface points at which the sensor receives reference high and low voltages, and "PING" represents an interface point at which the sensor receives inputs (e.g., commands) from external devices or circuitry.

Below is a more detailed description of illustrated components (e.g., electronic components) for a sensor device, according to some embodiments. Exemplary costs, in dollars, are included. It will be appreciated that these components represent some possible components, and that various embodiments are not restricted to just these components. Rather, various embodiments may include alternative and/or substitute components, and/or components in different quantities and/or combinations.

REF: C1; TYPE: MLCC; PACKAGE: 0805; VALUE A: 22 u; TOL.A: +/−20%; RATING1: >5VDC; RATING2:; MFR: Samsung; P/N: CL21A226KQCLRNC; COST: 0.01792

REF: C10; TYPE: MLCC; PACKAGE: 0603; VALUE A: 1200p; TOL.A: 5%; RATING1: >5VDC; RATING2:; MFR: AVX; P/N: 06035C122JAT2A; COST: 0.00028

REF: C11; TYPE: MLCC; PACKAGE: 0603; VALUE A: 0.1 u; TOL.A: +/−20%; RATING1: >5VDC; RATING2:; MFR: Yageo; P/N: CC0603JRX7R8BB104; COST: 0.0012

REF: C12; TYPE: MLCC; PACKAGE: 0603; VALUE A: 1200p; TOL.A: 5%; RATING1: >5VDC; RATING2:; MFR: AVX; P/N: 06035C122JAT2A; COST: 0.00277

REF: C2; TYPE: MLCC; PACKAGE: 0805; VALUE A: 2.2 u; TOL.A: +/−20%; RATING1: >5VDC; RATING2:; MFR: Samsung; P/N: CL21A225KAFNNNG; COST: 0.00769

REF: C3; TYPE: MLCC; PACKAGE: 0603; VALUE A: 0.1 u; TOL.A: +/−20%; RATING1: >5VDC; RATING2:; MFR: Yageo; P/N: CC0603JRX7R8BB104; COST: 0.0012

REF: C4; TYPE: MLCC; PACKAGE: 0603; VALUE A: 270p; TOL.A: 5%; RATING1: >100 VDC; RATING2:; MFR: Kemet; P/N: C0603C271JAGACAUTO; COST: 0.00308

REF: C5; TYPE: MLCC; PACKAGE: 0603; VALUE A: 1200p; TOL.A: 5%; RATING1: >5VDC; RATING2:; MFR: AVX; P/N: 06035C122JAT2A; COST: 0.00277

REF: C6; TYPE: MLCC; PACKAGE: 0603; VALUE A: 0.1 u; TOL.A: 5%; RATING1: >5VDC; RATING2:; MFR: Yageo; P/N: CC0603JRX7R8BB104; COST: 0.00231

REF: C7; TYPE: MLCC; PACKAGE: 0603; VALUE A: 1200p; TOL.A: 5%; RATING1: >5VDC; RATING2:; MFR: AVX; P/N: 06035C122JAT2A; COST: 0.00277

REF: C8; TYPE: MLCC; PACKAGE: 0603; VALUE A: 1200p; TOL.A: 5%; RATING1: >5VDC; RATING2:; MFR: AVX; P/N: 06035C122JAT2A; COST: 0.00277

REF: C9; TYPE: MLCC; PACKAGE: 0603; VALUE A: 0.01 u; TOL.A: 5%; RATING1: >5VDC; RATING2:; MFR: Kemet; P/N: C0603C103J5RACTU; COST: 0.00615

REF: D1; TYPE: Diode; PACKAGE: SOD-323; VALUE A:; TOL.A:; RATING1: Standard Diode; RATING2:; MFR: Fairchild; P/N: 1N914BWS; COST: 0.01385

REF: D2; TYPE: Schottky; PACKAGE: SOD-323; VALUE A:; TOL.A:; RATING1: MUST BE SCHOTTKY; RATING2: Vr>100V; MFR: ST Micro; P/N: BAT46JFILM; COST: 0.03538

REF: D3; TYPE: Diode; PACKAGE: SOD-323; VALUE A:; TOL.A:; RATING1: Standard Diode; RATING2:; MFR: Fairchild; P/N: 1N914BWS; COST: 0.01385

REF: D4; TYPE: Diode; PACKAGE: SOD-323; VALUE A:; TOL.A:; RATING1: Standard Diode; RATING2:; MFR: Fairchild; P/N: 1N914BWS; COST: 0.01385

REF: D5; TYPE: Diode; PACKAGE: SOD-323; VALUE A:; TOL.A:; RATING1: Standard Diode; RATING2:; MFR: Fairchild; P/N: 1N914BWS; COST: 0.01385

REF: L1; TYPE: Fixed Inductor; PACKAGE: SMD 4018; VALUE A: 4.7 uH; TOL.A: 20%; RATING1: Q>4.7 @ 2 MHz; RATING2:; MFR: Bourns; P/N: SRN4018TA-4R7M; COST: 0.09231

REF: P1; TYPE: Ceramic Piezo; PACKAGE: 10×1 mm; VALUE A: 1.7-2 MHz; TOL.A: 5%; RATING1:; RATING2:; MFR: STEMinc; P/N: SMD15T12S412; COST: 0.31385

REF: Q1; TYPE: PNP BJT; PACKAGE: SOT-23 (BEC); VALUE A: B>100; TOL.A:; RATING1: (DC Current Gain GREATER than 100); RATING2:; MFR: Toshiba; P/N: 2SA1312-BL(TE85L,F; COST: 0.07692

REF: Q2; TYPE: NPN BJT; PACKAGE: SOT-23 (BEC); VALUE A: 40<B<70; TOL.A:; RATING1: (DC Current Gain approximately 60); RATING2:; MFR: ON Semi; P/N: MMBT2907ALT1G; COST: 0.00892

REF: Q3; TYPE: NPN BJT; PACKAGE: SOT-23 (BEC); VALUE A: 40<B<70; TOL.A:; RATING1: (DC Current Gain approximately 60); RATING2:; MFR: ON Semi; P/N: MMBT2907ALT1G; COST: 0.00892

REF: Q4; TYPE: NPN BJT; PACKAGE: SOT-23 (BEC); VALUE A: 40<B<70; TOL.A:; RATING1: (DC Current Gain approximately 60); RATING2:; MFR: ON Semi; P/N: MMBT2907ALT1G; COST: 0.00892

REF: R1; TYPE: Resistor; PACKAGE: 0603; VALUE A: 56.2 k; TOL.A: 20%; RATING1:; RATING2:; MFR: Yageo; P/N: RC0603FR-0756KL; COST: 0.00066

REF: R10; TYPE: Resistor; PACKAGE: 0603; VALUE A: 10 k; TOL.A: 1%; RATING1:; RATING2:; MFR: Yageo; P/N: RC0603FR-0710KL; COST: 0.00066

REF: R11; TYPE: Resistor; PACKAGE: 0603; VALUE A: 330 k; TOL.A: 1%; RATING1:; RATING2:; MFR: Yageo; P/N: RC0603FR-07330KL; COST: 0.00066

REF: R12; TYPE: Resistor; PACKAGE: 0603; VALUE A: 56.2 k; TOL.A: 1%; RATING1:; RATING2:; MFR: Yageo; P/N: RC0603FR-0756KL; COST: 0.00066

REF: R13; TYPE: Resistor; PACKAGE: 0603; VALUE A: 499-ohm; TOL.A: 1%; RATING1:; RATING2:; MFR: Yageo; P/N: RC0603FR-07499RL; COST: 0.00066

REF: R14; TYPE: Resistor; PACKAGE: 0603; VALUE A: 56.2 k; TOL.A: 1%; RATING1:; RATING2:; MFR: Yageo; P/N: RC0603FR-0756KL; COST: 0.00066

REF: R15; TYPE: Resistor; PACKAGE: 0603; VALUE A: 499-ohm; TOL.A: 1%; RATING1:; RATING2:; MFR: Yageo; P/N: RC0603FR-07499RL; COST: 0.00066

REF: R2; TYPE: Resistor; PACKAGE: 0603; VALUE A: 1 k; TOL.A: 1%; RATING1:; RATING2:; MFR: Yageo; P/N: RC0603FR-071KL; COST: 0.00066

REF: R3; TYPE: Resistor; PACKAGE: 0603; VALUE A: 1 k; TOL.A: 1%; RATING1:; RATING2:; MFR: Yageo; P/N: RC0603FR-071KL; COST: 0.00066

REF: R4; TYPE: Resistor; PACKAGE: 0603; VALUE A: 1 k; TOL.A: 1%; RATING1:; RATING2:; MFR: Yageo; P/N: RC0603FR-071KL; COST: 0.00066

REF: R5; TYPE: Resistor; PACKAGE: 0603; VALUE A: 499-ohm; TOL.A: 1%; RATING1:; RATING2:; MFR: Yageo; P/N: RC0603FR-07499RL; COST: 0.00066

REF: R6; TYPE: Resistor; PACKAGE: 0603; VALUE A: 10 k; TOL.A: 1%; RATING1:; RATING2:; MFR: Yageo; P/N: RC0603FR-0710KL; COST: 0.00066

REF: R7; TYPE: Resistor; PACKAGE: 0603; VALUE A: 10 k; TOL.A: 1%; RATING1:; RATING2:; MFR: Yageo; P/N: RC0603FR-0710KL; COST: 0.00066

REF: R8; TYPE: Resistor; PACKAGE: 0603; VALUE A: 10 k; TOL.A: 1%; RATING1:; RATING2:; MFR: Yageo; P/N: RC0603FR-0710KL; COST: 0.00066

REF: R9; TYPE: Resistor; PACKAGE: 0603; VALUE A: 5 k; TOL.A: 1%; RATING1:; RATING2:; MFR: Yageo; P/N: RC0603FR-074K99L; COST: 0.00066

REF: U1; TYPE: Op Amp; PACKAGE: SOT-23-5; VALUE A: --; TOL.A: --; RATING1: BW>3 MHz, Slew>1.5V/us; RATING2: VCC>2.5V; MFR: ON SEMI; P/N: FAN4174IS5X; COST: 0.16923

REF: Process cost; TYPE:; PACKAGE:; VALUE A:; TOL.A:; RATING1:; RATING2:; MFR:; P/N:; COST: 0.11815

In various embodiments, sensor electronics are fully molded into the housing, enclosure, chasses, etc., which may make such electronics more robust against the elements.

Sensor 800 may include one or more attachment points, such as points 810. These attachment points may be for attachment of the sensor to the tank it is measuring. In some embodiments, these attachment points may protrude from the main body of the sensor. By protruding, they may have greater capacity to bend away from the main body of the sensor, providing a greater ability for the sensor to conform to variable surfaces. Further, where multiple attachment points are distant from one another, the sensor may be more securely anchored and less vulnerable to detach as a result of a spatially localized disturbance.

Attachment points may include magnets (e.g., magnet 815) to act as a means of attachment. As will be appreciated, various embodiments contemplate other means of attachment, such as sticky surfaces, suction cups, etc.

As will be appreciated, various embodiments contemplate that attachment points may be arranged in any suitable geometrical configuration, and/or that there may be any number of attachment points (e.g., 0, 1, 2, 3, 4, 5, 6, etc.), and/or that any suitable means of attachment may be used at attachment points.

In various embodiments, a sensor may include a connection point/jack 820 for a wire, cable, etc. In various embodiments, a sensor may include multiple jacks. The sensor may thus be connected to external electronic devices, such as to a controller.

In various embodiments, the sensor has an integrated thermal sensor. As a result, a sensor/thermal circuit may have direct thermal coupling with the base of the LPG tank. This may allow measurements to track the true temperature of the material (e.g., liquid propane) inside the tank very closely (as opposed to ambient measurement or other methods with loose or indirect thermal coupling). Obtaining a true temperature of the material in the tank may be critical for getting the most accurate results for thermal compensation (See F, below).

A sensing algorithm according to various embodiments uses a thermal reading in 'E' to compensate for changes in acoustic speed of propagation due to temperature variations of the tank. In some embodiments, accuracies within 1-2% error can be accomplished, whereas other methods without thermal compensation may have 8-10% error over the typical operating temperatures and ambient temperatures of an LPG tank.

Various embodiments include a system with a sensing/conditioning component and a physically separate processing component. These two components may be connected to one another, such as be wire or cable. By having these components separate, the 'sensor' part may be small and thin enough to fit under an LPG tank without contacting the resting surface of the tank.

Figure 9:
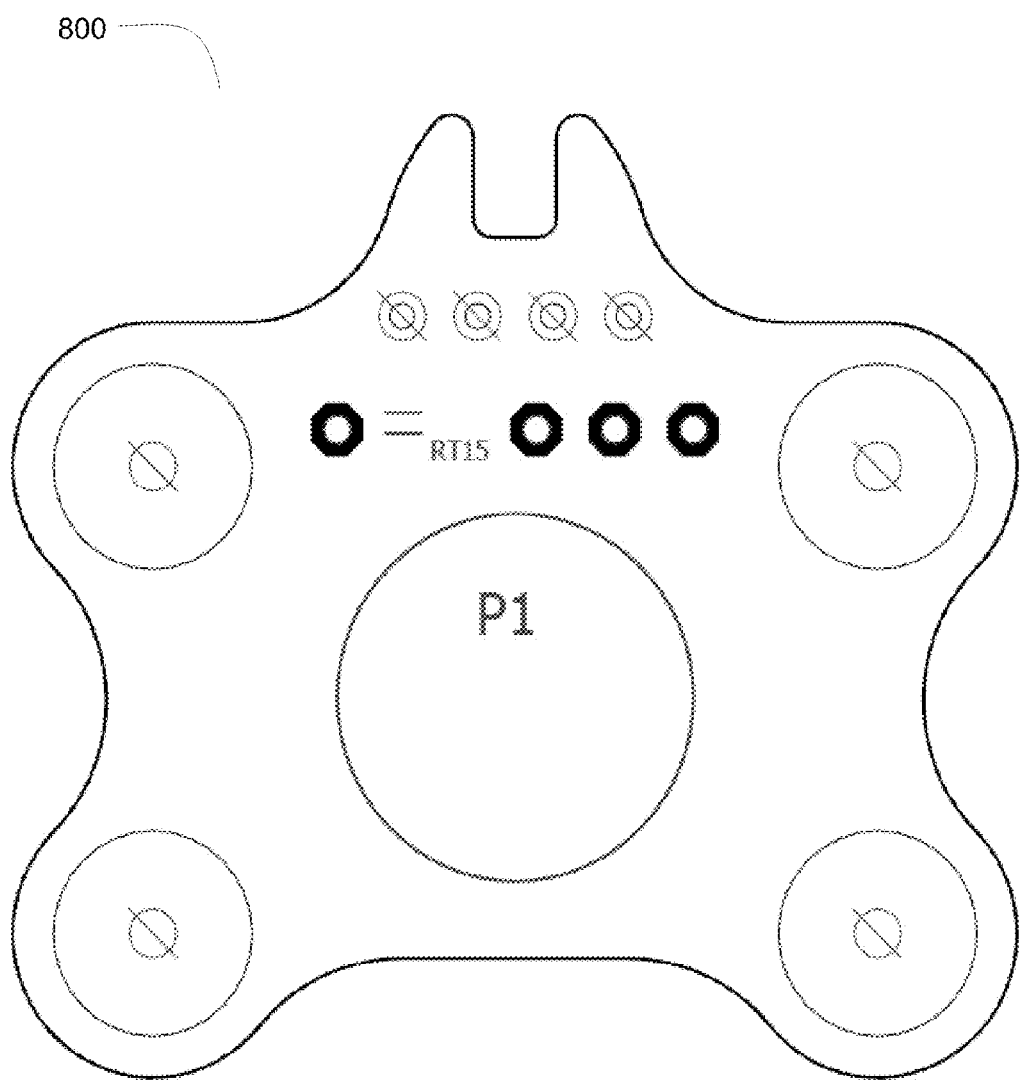
FIG. 9 illustrates a sensor, according to some embodiments.

FIG. 9 depicts sensor 800 in a view from the bottom, according to various embodiments.

Signals Generated and Received

Figure 10:
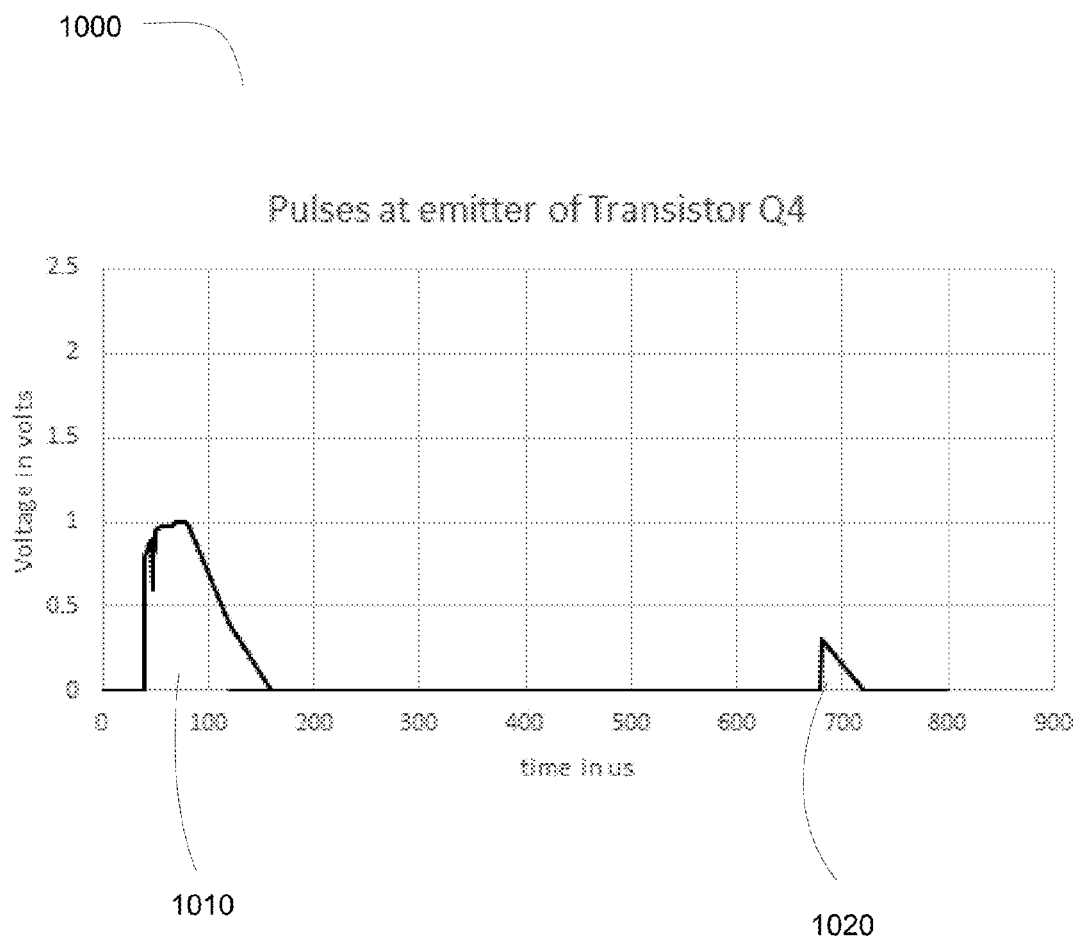
FIG. 10 illustrates a signal, according to various embodiments.
Figure 11:
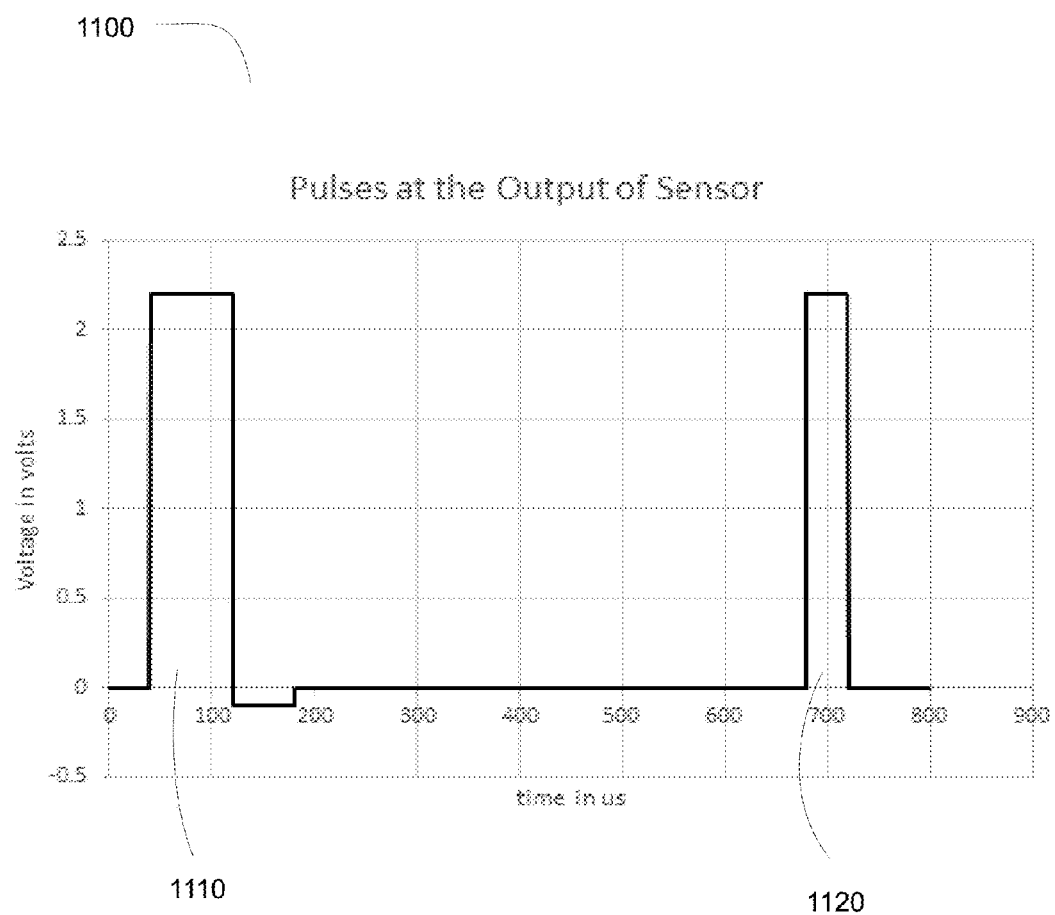
FIG. 11 illustrates a signal, according to various embodiments.
Figure 12:
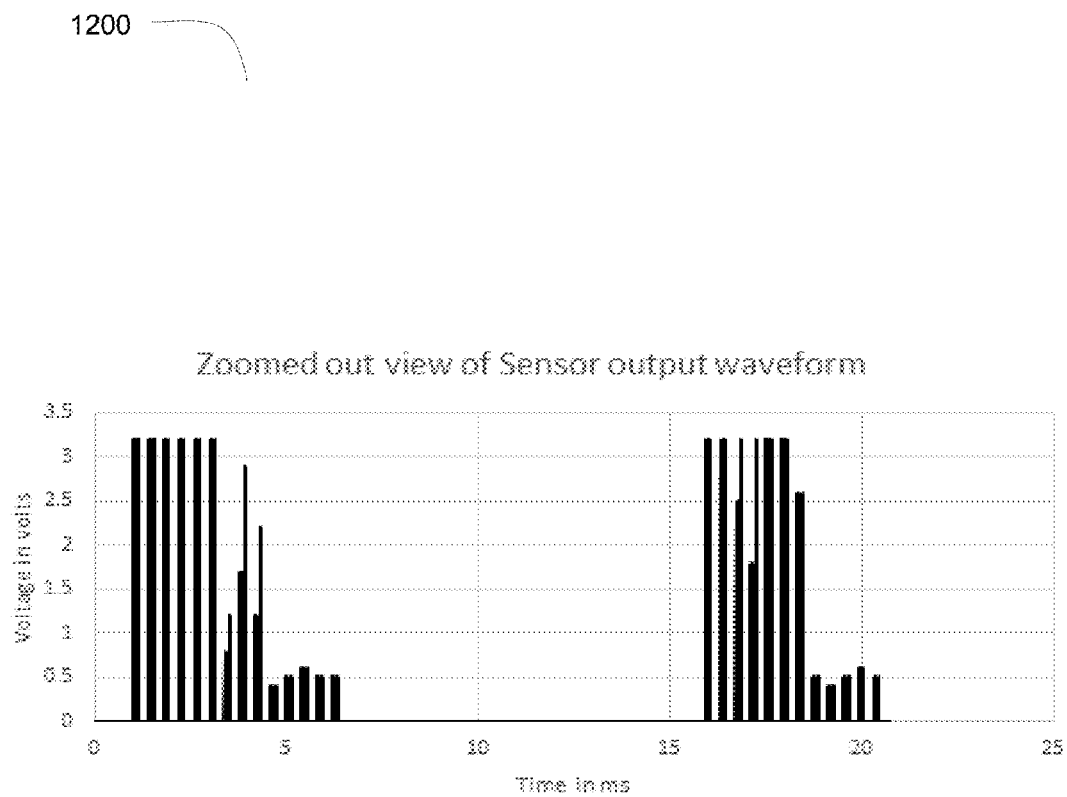
FIG. 12 illustrates a signal, according to various embodiments.

With reference to FIGS. 10-12, some pertinent signals are discussed according to various embodiments.

In an operating scenario, a pulse from microcontroller starts oscillations in the LC tank circuit. This acts as an excitation signal to the ultrasonic piezoelectric transducer. The transducer in turn sends a quick pulse of ultrasonic waves into the bottom of the LPG tank.

The piezoelectric transducer is receptive to any incoming or ambient ultrasonic waves, including those that it is generating itself. The piezoelectric transducer, in turn, converts such incoming or ambient ultrasonic waves into an electrical signal. The electrical signal from the piezoelectric transducer is sampled by the sensor, e.g., at the junction of Resistor R10, Capacitor C9, Diode D3 and emitter of Transistor Q4 in FIG. 8. The sampled electrical signal 1000 is illustrated in FIG. 10, according to various embodiments.

As depicted, signal 1000 includes "peaks" 1010, and 1020. Peak 1010 represents the initial excitation signal generated by the transducer, and may also include a portion of the excitation signal that has been immediately reflected off the bottom of the tank (e.g., the propane tank) back to the piezoelectric transducer. Peak 1020 represents the ultrasonic waves that have reflected off the top surface of the material stored in the tank (e.g., off the boundary where the fuel in the tank meets the air/gas), and returned to the piezoelectric transducer. As might be expected, peak 1020 is smaller than peak 1010 because the strength of the returning ultrasonic waves are weaker than the initial outgoing ultrasonic waves.

In various embodiments, since the returning signal may be weak (e.g., the voltage associated with the returning signal may be weak), the sampled signal may be amplified. The amplification may be performed by an operational amplifier, for example.

Signal 1100 is an amplified version of signal 1000, according to various embodiments. The amplified signal 1100 may reach a maximum of 2.2 Volts, for example. With this amplification, the reflected signal may be registered by the microcontroller (e.g., once the reflected signal is passed onto the microcontroller by the sensor). The microcontroller may then calculate a time delay between amplified peak 1110 (representing the excitation signal), and amplified peak 1120 (representing the reflected signal), and use the time delay to calculate a quantity of material remaining in the tank.

In various embodiments, the acoustic wave induces an electrical pulse of proportional magnitude on the electrodes of the piezo electric transducer. However, the induced voltage may be low in magnitude and may require amplification before it can be processed by the controller. In various embodiments, the returned signal is amplified using a two-stage amplifier. The positive half of this amplified signal is then fed to a slope detector, which convert it into a train of pulses. The steeper the slope, the stronger the signal. Such a train of pulses 1200 is depicted, according to various embodiments, in FIG. 12. Signal 1200 may represent a zoomed out version of the output signal from the Sensor (The OUT node on sensor 800 in FIG. 8, e.g., signal 1100). In order to improve the accuracy, multiple samples (e.g., up to one hundred samples) may be taken (e.g., by firmware), and the best round trip time of the signal may be noted.

The microcontroller measures the time period between two consecutive pulses to determine the distance travelled which is related to (e.g., proportionate to) the tank level.

It will be noted that it would be theoretically possible for some portion of the ultrasonic waves to travel through the air/gas above the fuel in the tank, reflect off the top of the tank, then travel downwards through the air/gas and the liquid again, and return to the sensor. However, these reflected acoustic waves would be weaker than those reflected off the liquid/gas boundary. Therefore, according to some embodiments, a piezo electric transducer is chosen such that it is sensitive to acoustic signals reflected off the liquid/gas boundary, but not sensitive to those reflected off the very top of the tank. In various embodiments, a piezo electric transducer may be sensitive to the latter waves, but an amplifier and/or amplification level may be chosen such that a signal representing acoustic waves reflected off the top of the container is not amplified to a degree significant enough to be recognizable by the microcontroller (e.g., to 2.2V), while a signal representing acoustic waves reflected off the liquid-gas boundary is amplified to a degree significant enough to be recognizable by the microcontroller.

In various embodiments, the microcontroller may even detect a signal representing waves reflected off the top of the tank/container. However, the microcontroller may recognize these reflected waves for what they are due to one or more factors, including their time delay (e.g., characteristic time delay, e.g., relatively lengthy time delay), their time delay relative to other signals received (e.g., relative to signals received earlier from reflections off the liquid/gas boundary), their signal strength (e.g., relatively weak signal strength), their signal shape, or via any other factor or combination of factors.

Meniscus

In various embodiments, the surface of a liquid (e.g., fuel) in a tank may not form a perfectly flat surface at its boundary with the air/gas. Rather, the liquid may form a meniscus that is convex or concave. The particular shape of the meniscus may depend on various factors, including the particular liquid (e.g., fuel), the tank material, any coating applied to the inside of the tank, the shape of the tank, the cross-sectional area of the tank, and/or any other pertinent factors.

With a concave meniscus, the round-trip flight time alone may tend to underestimate the amount of material remaining, since the initial reflection of the acoustic waves would have occurred at the lowest point on the meniscus. Accordingly, a calculation to determine an amount of material remaining may correct for the shape of the meniscus. For example, the calculation may assume a slightly higher round-trip flight time than that measured (e.g., higher by 1%), assume a slightly greater depth of material (e.g., 0.5% greater depth), assume a slightly greater quantity of material (e.g., 1% greater quantity), and/or make some other assumption, correction, or alteration to a calculation.

With a convex meniscus, the round-trip flight time alone may tend to overestimate the amount of material remaining, since the initial reflection of the acoustic waves would have occurred at the highest point on the meniscus. Accordingly, a calculation to determine an amount of material remaining may correct for the shape of the meniscus. For example, the calculation may assume a slightly lower round-trip flight time than that measured (e.g., lower by 1%), assume a slightly lesser depth of material (e.g., 0.5% lesser depth, e.g., 5 mm lesser depth), assume a slightly lesser quantity of material (e.g., 1% lesser quantity), and/or make some other assumption, correction, or alteration to a calculation.

Multiple Connections on Jacks

In various embodiments, the sensor module (e.g., the sensor) is connected to a display/controller module which has an MCU and communication module. In various embodiments, the display/controller has more than one jack or port to accommodate different sensors. The sensors may serve unrelated purposes, but may still have readings of interest to a central or back-end server. For example, the same module (e.g., the module including the display and controller) may be connected to a first sensor for determining the amount of material remaining in a tank, and a second sensor for determining a temperature signal at a cooking grill. Each of the multiple sensors may be connected to the display/controller module via a cable, wire, etc., which may plug into a respective port or jack of the display/controller module.

In various embodiments, a first sensor is used to measure the amount of material remaining in a tank. For example, the first sensor may use acoustic waves. The first sensor may, in turn, be in communication with a controller, microcontroller, processor, external device, and/or any other device. The external device may take readings from the first sensor regarding the amount of material remaining in the tank.

In various embodiments, the external device may also be configured to record other conditions or circumstances in the vicinity of the tank. For example, the tank may be used to supply fuel to a cooking grill. The external device may monitor the amount of fuel remaining in the tank. The external device may also be configured to monitor the temperature of the grill. A second sensor may take temperature readings from the grill or near the grill. If the second sensor were to also communicate directly with the external device, then the external device would have to now manage two channels of communication, one for each of the first and second sensor. Further, the second sensor might require additional complexity, such as Wi-Fi capability or other communications capabilities. The management task might only grow more complex if there were additional items that the external device was monitoring.

According to various embodiments, the first sensor may serve as a common means, or hub, via which to communicate with an external device. The first sensor may include one or more jacks or connectors to which additional sensors may be connected. A wire, cable, or other means may be used to connect the second sensor to the first sensor. In this way, the second sensor (or any additional sensors) may be connected to the first sensor. Information from the second sensor (or any additional sensors) may then be routed through the first sensor, and communicated to the external device. In this way, the number of channels of communication to the external device may be reduced or minimized (e.g., minimized to one channel). Additionally or alternatively, the complexity of the second sensor, or any additional sensor, may be reduced since the second sensor need not have sophisticated communication means.

According to the various embodiments, a first sensor that uses acoustic waves to measure the amount of material remaining in a tank may also include a jack for connection with a second sensor. The second sensor may be a temperature sensor for measuring the temperature of a grill. The first sensor may communicate with an external device. The first sensor may communicate readings from both the first sensor and the second sensor to the external device.

In various embodiments, a controller/display module serves as a common means, or hub, via which to communicate with an external device. The controller/display module may include one or more jacks or connectors to which sensors may be connected (e.g., to which a sensor using ultrasound may be connected, e.g., to which a sensor measuring cooking temperature may be connected). A wire, cable, or other means may be used to connect each sensor to the controller/display module. In this way, multiple sensors may be connected to the controller/display module. Information from sensors may then be routed through the controller/display module, and communicated to the external device. In this way, the number of channels of communication to the external device may be reduced or minimized (e.g., minimized to one channel). Additionally or alternatively, the complexity of each sensor may be reduced since the second sensor need not have sophisticated communication means.

In various embodiments, a sensor is infused with piezo sensor and collects two types of data. One such type of data may be timing data representing round-trip acoustic signal flight times. Another such type of data may be the temperature of the tank surface close to travel point.

In various embodiments, additional types of data may be obtained. A sensor may detect, determine, and/or receive such data as positioning data (e.g., Global Positioning System data), motion data, acceleration data, altitude data, tilt data, etc. For instance, motion data may be received via an inbuilt accelerometer.

In various embodiments, different components may be used. E.g., the sensor may use any suitable component for measuring temperature and/or for measuring acoustic waves.

In various embodiments, temperature data is sent to a controller (e.g., a microcontroller module or unit). The temperature data may be sent via the same wire used to send other sensing data (e.g., acoustic wave data). This may reduce the need for extra wires. In various embodiments, temperature data and data or signals representing acoustic waves (e.g., data on the round-trip flight times of acoustic waves, e.g., data on the measured voltages induced in a piezo electric sensor by acoustic waves) may be sent via the same wire.

In various embodiments, the sensor module is connected to a hand held display via wire, blue tooth and/or wifi, zwave, and/or any other communication protocol.

Sensor data can be shown on a smartphone (or on any other device, e.g., laptop, personal computer, etc.) via an application, app, web page, browser, program, and/or via any other means. Sensor data may reach a smartphone or other device via wireless communication, or via any other means of communication.

In various embodiments, a smartphone or other device is connected to a back-end cloud based system where tank level information is stored for visualization and analytics. As will be appreciated, various embodiments contemplate that any centralized or decentralized storage system may be used to store data from one or more sensors and/or from one or more controllers, controller modules, etc. Such a system may include a server, data center, cloud, etc.

In various embodiments, a back-end system has information pertaining to one or more sensors (e.g., attached to one or more storage tanks). The information may include measurements or readings from the sensor(s). The information may include calculations or derivations based on sensor readings, such as how much fuel remains in a tank, or what percentage of fuel remains in a tank. The information may also include other information, such as the location of the sensors, the owner of the associated storage tanks, etc. The back-end system may index or sort the information about the sensors in various ways. For instance, information about one or more sensors may be stored in a database using one or more tables.

In various embodiments, a user can log into or otherwise access the back end system. The user may log in via web browser, app, graphical user interface, etc. The user can perform a query/search among the sensors based on one or more criteria. Such criteria may include tank level (e.g., what percent of fuel still remains in a tank), zip code, and geographic location. The user may, for example, use such a search to determine who will be running out of fuel soon and predict the empty date based on consumption patterns.

This information can be used in scheduling of the tank delivery, for marketing and/or for inventory calculation purposes.

In various embodiments, the back-end system (or any other device or system) may perform analytics on data received from one or more sensors. Analytics may include predictive analytics. For example, for a given sensor, the system may examine a time series of storage tank fill over time. The system may estimate a rate of fuel usage and may thereby predict a time when fuel will be completely exhausted.

In various embodiments, the system may account for predicted weather patterns in a geographic location of a sensor. For example, if weather forecasts anticipate a hot day, the system may anticipate that use of a grill may be more likely, and may thereby anticipate an earlier date when fuel will be completely exhausted. In various embodiments, the system may account for anticipated sporting events or other events, holidays (e.g., July 4), etc., during which use of fuel might be more likely. The system may incorporate such events into a model to predict when fuel in a given tank might be exhausted.

Controller

As used herein, "controller", "microcontroller", "microcontroller unit", "MCU" and the like may refer to electronics, logic and/or circuitry capable of performing, steps, functions, operations, calculations, and/or logic according to one or more embodiments. An MCU may be an integrated circuit, for example.

In various embodiments, the controller may be separate from the sensor. The controller may be connected to the sensor via a wire or cable. In this way, the sensor may take up less space and may thus, for example, fit on the underside of a tank.

In various embodiments, the controller and the sensor are contained within the same housing, unit, chassis, enclosure, etc.

In various embodiments, the controller may be packaged or collocated with a display. The controller may be referred to herein as a "controller/display", "controller/display module", or the like.

In various embodiments, the controller is connected to a display (e.g., the controller and display may be attached to the same circuit board and/or contained within the same enclosure). The display may be a simple liquid crystal display (e.g., capable of displaying two characters), and/or any other display. In various embodiments, the display may have more resolution, use any technology, etc.

Figure 16:
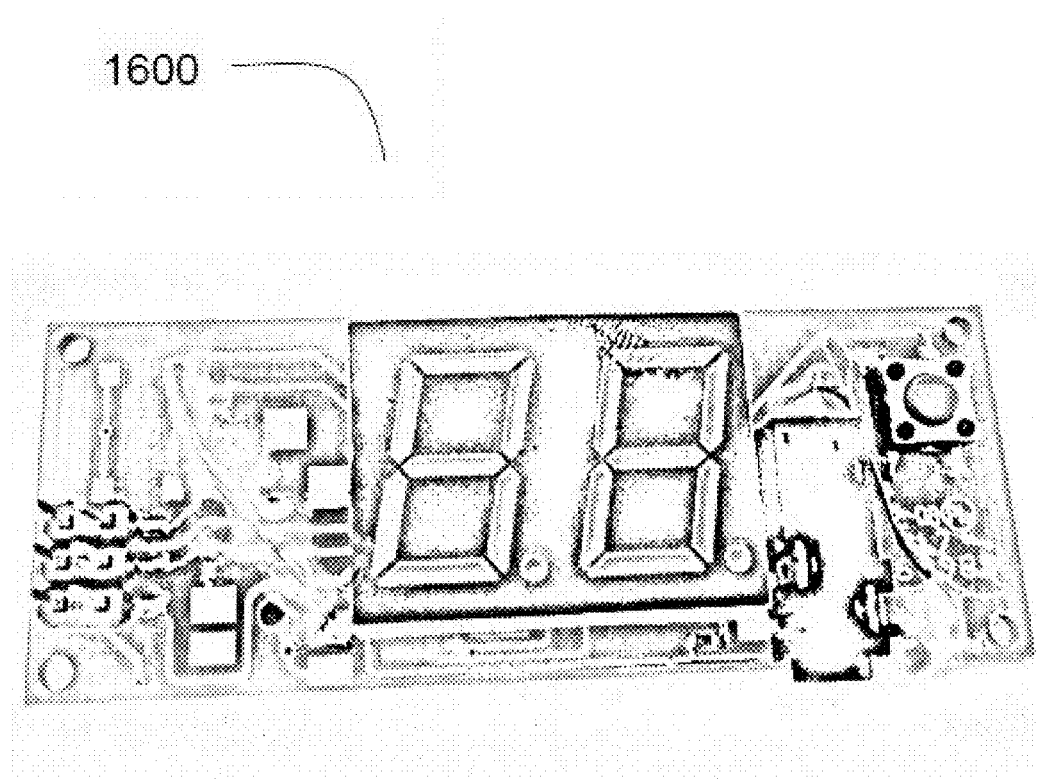
FIG. 16 illustrates a component that includes a controller and display, according to some embodiments.

FIG. 16 illustrates a component that includes a controller and display, according to some embodiments.

In operation, a controller may receive one or more signals from the sensors. Such signals may include temperature readings, and pulses representative of acoustic waves detected at the sensor. The controller may use one or more methods (e.g., methods described herein) to calculate an amount of fuel remaining in the tank. The controller may then send instructions to the display to show the amount remaining.

Some Components

The following represent components and costs that may be used in devices and systems, according to various embodiments. Exemplary costs, in dollars, are included. It will be appreciated that these components represent some possible components, and that various embodiments are not restricted to just these components. Rather, various embodiments may include alternative and/or substitute components, and/or components in different quantities and/or combinations.

The following are exemplary components for a controller, according to some embodiments:

REF: C1; TYPE: MLCC; PACKAGE: 0805; VALUE A: 2.2 u; TOL.A: 0.2; RATING1: >6.3 VDC; RATING2:; MFR: C1 MLCC 0805 2.2 u 20%>6.3 VDC; P/N:; COST: 0.01792

REF: C2; TYPE: MLCC; PACKAGE: 0603; VALUE A: 0.1 u; TOL.A: 0.2; RATING1: >6.3 VDC; RATING2:; MFR:; P/N:; COST: 0.00028

REF: C3; TYPE: MLCC; PACKAGE: 0603; VALUE A: 0.1 u; TOL.A: 0.2; RATING1: >6.3 VDC; RATING2:; MFR:; P/N:; COST: 0.00028

REF: C4; TYPE: MLCC; PACKAGE: 0603; VALUE A: 1000p; TOL.A: 0.2; RATING1: >6.3 VDC; RATING2:; MFR:; P/N:; COST: 0.00092

REF: J1; TYPE: 3×2 Header; PACKAGE: SMT; VALUE A: 0.1"×0.1"; TOL.A:; RATING1:; RATING2:; MFR: Molex; P/N: 15912060; COST: 0.03231

REF: J2; TYPE: TRRS Jack; PACKAGE: SMT; VALUE A: 1.5 m; TOL.A:; RATING1:; RATING2:; MFR: CUI; P/N: SJ-43514-SMT-TR; COST: 0.53846

REF: R1; TYPE: Resistor; PACKAGE: 0603; VALUE A: 49.9 R; TOL.A: 0.05; RATING1:; RATING2:; MFR:; P/N:; COST: 0.00066

REF: R2; TYPE: Resistor; PACKAGE: 0603; VALUE A: 49.9 R; TOL.A: 0.05; RATING1:; RATING2:; MFR:; P/N:; COST: 0.00066

REF: R3; TYPE: Resistor; PACKAGE: 0603; VALUE A: 49.9 R; TOL.A: 0.05; RATING1:; RATING2:; MFR:; P/N:; COST: 0.00066

REF: R4; TYPE: Resistor; PACKAGE: 0603; VALUE A: 10 k; TOL.A: 0.05; RATING1:; RATING2:; MFR:; P/N:; COST: 0.00038

REF: R5; TYPE: Resistor; PACKAGE: 0603; VALUE A: 2 k; TOL.A: 0.01; RATING1:; RATING2:; MFR:; P/N:; COST: 0.00066

REF: R6; TYPE: Resistor; PACKAGE: 0603; VALUE A: 10 k; TOL.A: 0.01; RATING1:; RATING2:; MFR:; P/N:; COST: 0.00066

REF: R7; TYPE: Resistor; PACKAGE: 0603; VALUE A: 30 ohm; TOL.A: 0.01; RATING1:; RATING2:; MFR:; P/N:; COST: 0.00066

REF: R8; TYPE: Resistor; PACKAGE: 0603; VALUE A: 30 ohm; TOL.A: 0.01; RATING1:; RATING2:; MFR:; P/N:; COST: 0.00066

REF: SW1; TYPE: Tactile Switch; PACKAGE: SMD 6 mm; VALUE A: Normally Open 6*6*43; TOL.A:; RATING1:; RATING2:; MFR: Apem; P/N: DTSM-61N-V-T/R; COST: 0.00769

REF: U1; TYPE: MCU; PACKAGE: QFP-32; VALUE A:; TOL.A:; RATING1:; RATING2:; MFR: Microchip; P/N: ATmega48; COST: 0.89231

REF: DIS1; TYPE: Dual 7-Seg Disp; PACKAGE: DIP-16; VALUE A: 90mcd @ 25 mA; TOL.A:; RATING1:; RATING2:; MFR: ROHM; P/N: LB-602AA2; COST: 0.23077

REF: Q1; TYPE: NMOS FET; PACKAGE: SOT-23 (BEC); VALUE A:; TOL.A:; RATING1: Rds_on<10 ohm @ 3V; RATING2:; MFR:; P/N:; COST: 0.01538

REF: Process cost; TYPE:; PACKAGE:; VALUE A:; TOL.A:; RATING1:; RATING2:; MFR:; P/N:; COST: 0.11692

The following are exemplary components for a controller, according to some embodiments:

REF: C1; TYPE: MLCC; PACKAGE: 0805; VALUE A: 2.2 u; TOL.A: +80/−20%; RATING1: >5VDC; RATING2: X7R or better; MFR: Yageo; P/N: CC0805MRX5R6BB225

REF: C2; TYPE: MLCC; PACKAGE: 0603; VALUE A: 0.1 u; TOL.A: +80/−20%; RATING1: >5VDC; RATING2: X7R or better; MFR: Samsung; P/N: CL10B104KO8NNNC REF: C3; TYPE: MLCC; PACKAGE: 0603; VALUE A: 0.1 u; TOL.A: +80/−20%; RATING1: >5VDC; RATING2: X7R or better; MFR: Samsung; P/N: CL10B104KO8NNNC REF: C4; TYPE: MLCC; PACKAGE: 0603; VALUE A: 1000p; TOL.A: +80/−20%; RATING1: >5VDC; RATING2: X7R or better; MFR: Samsung; P/N: CL10B102KC8NNNC REF: C5; TYPE: MLCC; PACKAGE: 0603; VALUE A: 0.1 u; TOL.A: +80/−20%; RATING1: >5VDC; RATING2: X7R or better; MFR: Samsung; P/N: CL10B104KO8NNNC REF: C6; TYPE: MLCC; PACKAGE: 0603; VALUE A: 18p; TOL.A: NPO; RATING1: >5VDC; RATING2: NPO; MFR: Samsung; P/N: CL10C180JB8NNNC REF: C7; TYPE: MLCC; PACKAGE: 0603; VALUE A: 18p; TOL.A: NPO; RATING1: >5VDC; RATING2: NPO; MFR: Samsung; P/N: CL10C180JB8NNNC REF: C8; TYPE: MLCC; PACKAGE: 0603; VALUE A: 1000p; TOL.A: +80/−20%; RATING1: >5VDC; RATING2: X7R or better; MFR: Samsung; P/N: CL10B102KC8NNNC REF: C9; TYPE: MLCC; PACKAGE: 0805; VALUE A: 2.2 u; TOL.A: +80/−20%; RATING1: >5VDC; RATING2: X7R or better; MFR: Yageo; P/N: CC0805MRX5R6BB225

REF: R1; TYPE: SMD Resistor; PACKAGE: 0603; VALUE A: 100-ohm; TOL.A: +/−10%; RATING1:; RATING2:; MFR: Yageo; P/N: RC0603FR-07100RL REF: R2; TYPE: SMD Resistor; PACKAGE: 0603; VALUE A: 6.19 k; TOL.A: +/−1%; RATING1:; RATING2:; MFR: Yageo; P/N: RC0603FR-076K19L REF: R3; TYPE: SMD Resistor; PACKAGE: 0603; VALUE A: 100-ohm; TOL.A: +/−10%; RATING1:; RATING2:; MFR: Yageo; P/N: RC0603FR-07100RL REF: R4; TYPE: SMD Resistor; PACKAGE: 0603; VALUE A: 10 k; TOL.A: +/−10%; RATING1:; RATING2:; MFR: Yageo; P/N: RC0603FR-0710KL REF: R5; TYPE: SMD Resistor; PACKAGE: 0603; VALUE A: 2 k; TOL.A: +/−1%; RATING1:; RATING2:; MFR: Yageo; P/N: RC0603FR-072KL REF: R6; TYPE: SMD Resistor; PACKAGE: 0603; VALUE A: 10 k; TOL.A: +/−1%; RATING1:; RATING2:; MFR: Yageo; P/N: RC0603FR-0710KL REF: R7; TYPE: SMD Resistor; PACKAGE: 0603; VALUE A: 30-ohm; TOL.A: +/−5%; RATING1: 12 mW; RATING2:; MFR: Yageo; P/N: RC0603FR-0730RL REF: R8; TYPE: SMD Resistor; PACKAGE: 0603; VALUE A: 30-ohm; TOL.A: +/−5%; RATING1: 12 mW; RATING2:; MFR: Yageo; P/N: RC0603FR-0730RL REF: R9; TYPE: SMD Resistor; PACKAGE: 0603; VALUE A: 4.7 k; TOL.A: +/−5%; RATING1:; RATING2:; MFR: Yageo; P/N: RC0603FR-074K7L REF: U1; TYPE: MCU; PACKAGE:; VALUE A:; TOL.A:; RATING1:; RATING2:; MFR: Microchip; P/N: ATMEGA48PB-AU (ALT PA/A)

REF: K1; TYPE: Crystal; PACKAGE: HC49; VALUE A: 3.6864 MHz; TOL.A: 50 ppm; RATING1: 18 pF CL; RATING2:; MFR: Abracon; P/N: ABLS-3.6864MHZ-DT REF: J1; TYPE: Pogo Pin Header; PACKAGE:; VALUE A:; TOL.A:; RATING1:; RATING2:; MFR: ---; P/N: ---

REF: SW1; TYPE: Button; PACKAGE:; VALUE A: Normally Open; TOL.A:; RATING1:; RATING2:; MFR: C & K; P/N: PTS645SM43SMTR92 LFS REF: DIS1; TYPE: 7-Segment Display; PACKAGE:; VALUE A:; TOL.A:; RATING1:; RATING2:; MFR: ROHM; P/N: LB-602AA2

REF: J2; TYPE: TRRS Jack; PACKAGE: 3.5 mm TRRS; VALUE A:; TOL.A:; RATING1:; RATING2:; MFR: CUI Inc; P/N: SJ4351-4-SMT REF: Q1; TYPE: N-MOSFET; PACKAGE:; VALUE A: <10 ohm @ Vgs=2.5V; TOL.A:; RATING1:; RATING2:; MFR: ON Semi; P/N: NTR4003NT1G REF: BH1; TYPE: Battery Holder; PACKAGE:; VALUE A:; TOL.A:; RATING1:; RATING2:; MFR: Keystone; P/N: 3034

REF: BH2; TYPE: Battery Holder; PACKAGE:; VALUE A:; TOL.A:; RATING1:; RATING2:; MFR: Keystone; P/N: 3034

REF: D1; TYPE: Dual Schottky; PACKAGE: SOT-23; VALUE A:; TOL.A:; RATING1: IDC>35 mA; RATING2:; MFR: Panasonic; P/N: DB3X313NOL With reference to FIG. 13, a sensor is depicted according to some embodiments. As depicted, the sensor is connected to a wire/cable for interfacing to external electronics and/or devices. With reference to FIG. 14, a zoomed out depiction of the sensor also shows the full connected wire.

Figure 13:
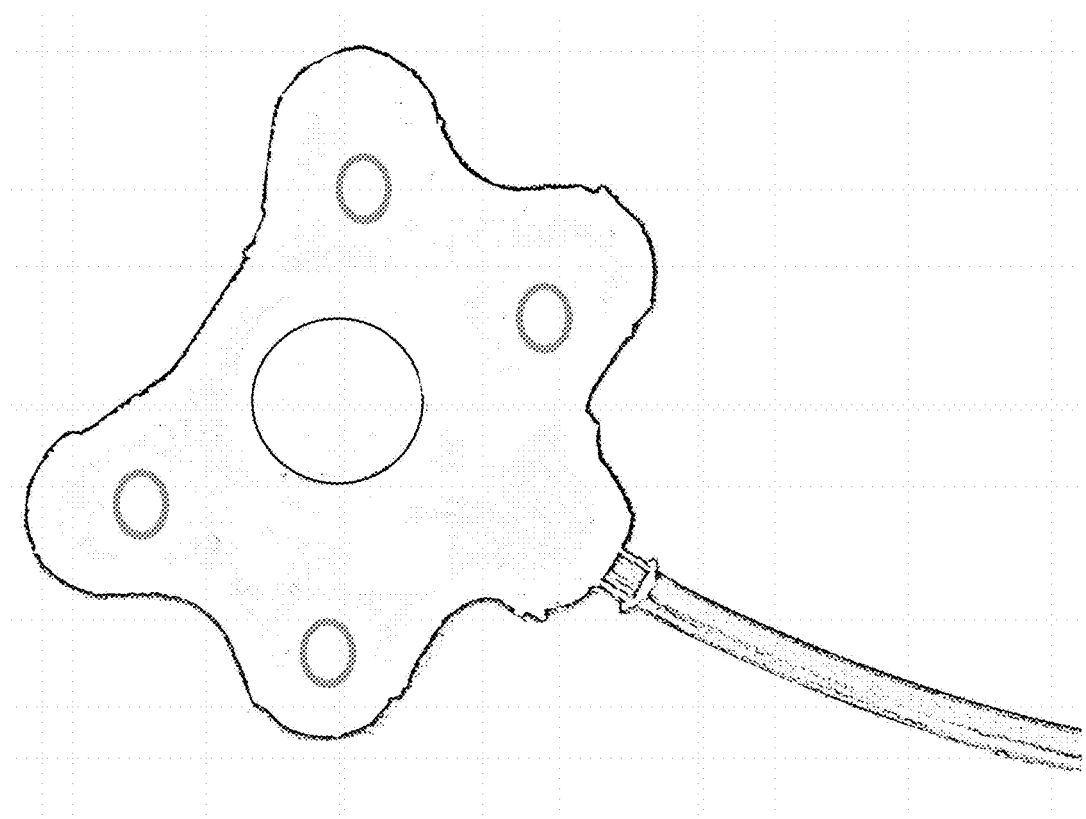
FIG. 13 illustrates a sensor, according to some embodiments.
Figure 14:
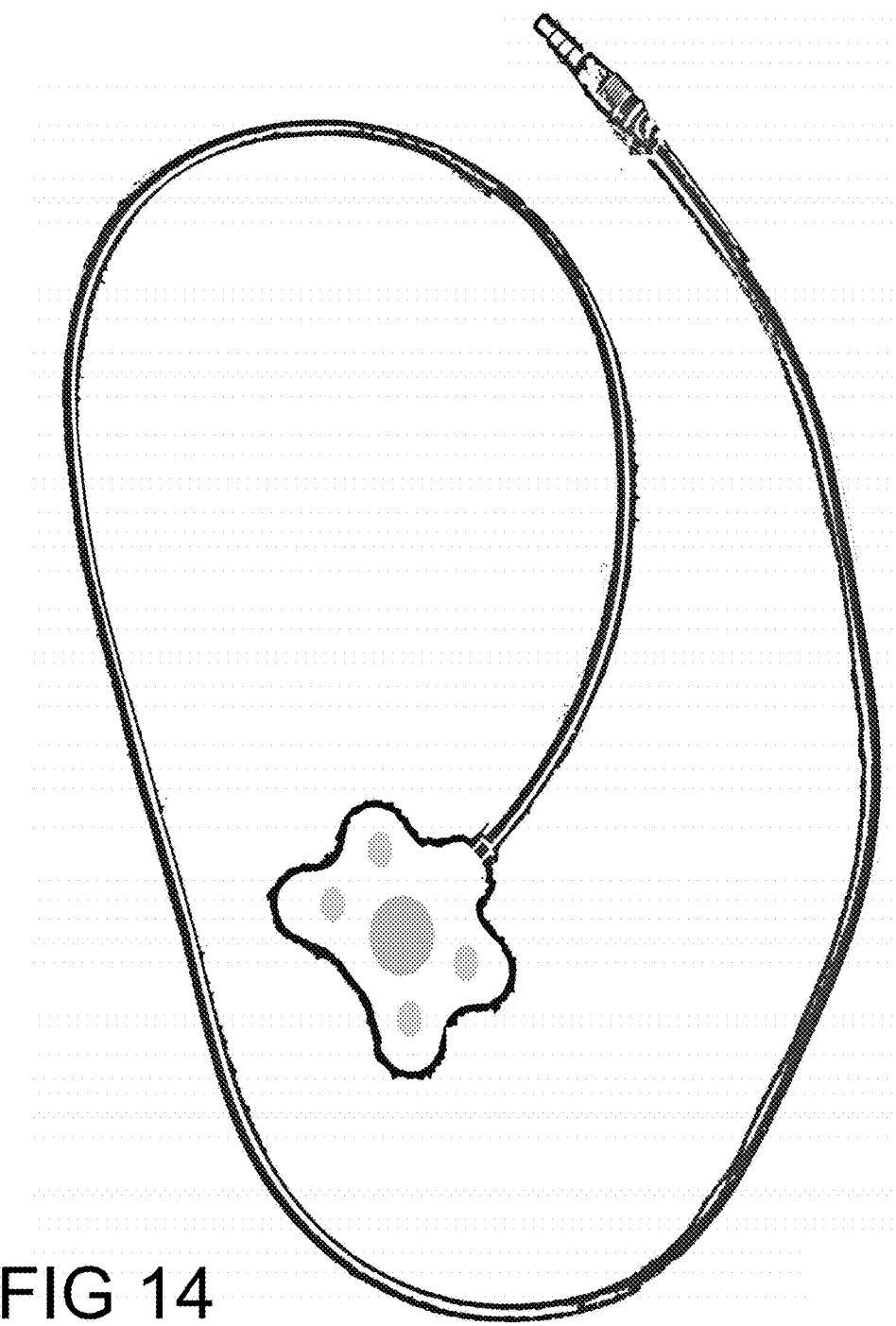
FIG. 14 illustrates a sensor, according to some embodiments.

FIGS. 13 and 14 illustrate a sensor according to some embodiments. However, it will be appreciated that various embodiments contemplate other colors, shapes, geometries, types of connecting wires/cables, means of communication with external devices (e.g., wireless means of communication), and other features and details.

Figure 15:
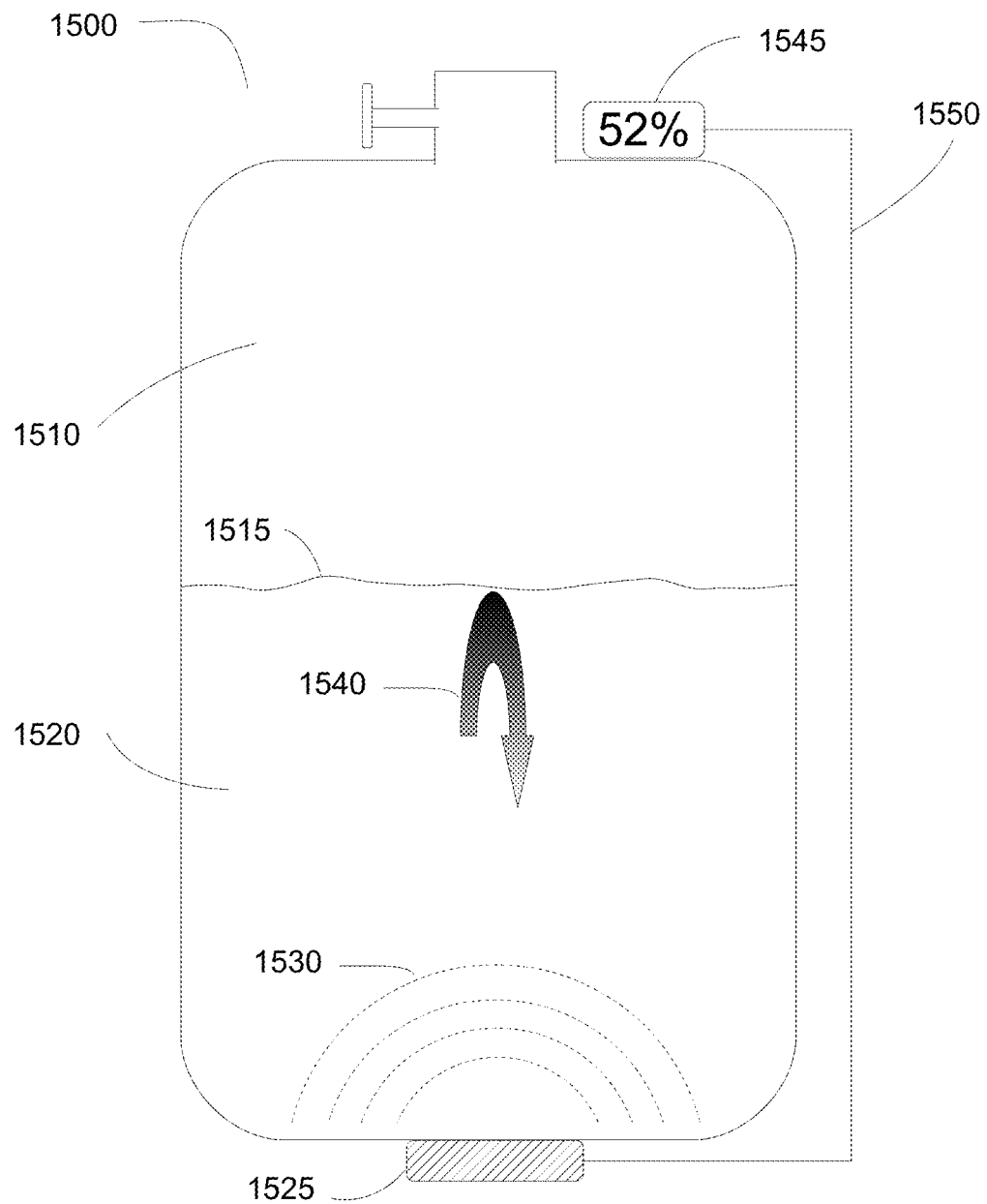
FIG. 15 illustrates a storage tank and a system according to some embodiments.

With reference to FIG. 15, an operational context is described according to some embodiments. A storage tank 1500 includes a sensor 1525 attached to the bottom. As depicted, the sensor is on the outside of the tank. However, in various embodiments, the sensor may be on the inside, built into the wall of the tank, and/or in any other suitable configuration with respect to the tank. The tank includes liquid 1520 (e.g., fuel, e.g., LPG), and gas/air 1510 representing an empty portion of the tank. A boundary between the liquid and gas (i.e., the surface of the liquid) is depicted at 1515. The sensor emits acoustic waves 1530. These eventually reach the boundary 1515 and are reflected, as depicted by arrow 1540. The reflected signals are then received back at the sensor 1525.

In various embodiments, a separate controller and display are present 1545 (e.g., a controller/display module), and may be attached, e.g., to the top of the tank. The sensor may communicate with the controller via a wire or cable 1550.

The sensor may transmit signals indicative of the received acoustic waves to the controller. Such signals may include amplified signals. The sensor may also transmit other data to the controller, such as temperature readings. The controller may then calculate round-trip flight time for the acoustic signal. The round-trip flight time may then be used to compute the amount of liquid remaining in the tank. Other factors may be used in the calculation too, e.g., tank geometry.

The display associated with the controller may then show an indication of the amount of liquid remaining. For example, the display may indicate that the tank is "52%" full.

Calculations and Correction Factors

What follows are illustrative embodiments for determining the amount of material (e.g., fuel) remaining in a tank under various assumptions. As will be appreciated, the illustrative numbers, measurements, constants, figures, etc., are meant to be illustrative of various embodiments, but are not intended to be limiting. It will be appreciated that various embodiments contemplate other illustrative numbers, measurements, constants, figures, etc. than those described herein.

In various embodiments, the circumference of the tank is measured (e.g., as 38.6 inches), and the radius $R_0$ is derived by dividing the circumference by $2*\pi$.

$$R_0 = 38.6 \text{ in}/(2*\pi) = 6.14 \text{ in}$$

In various embodiments, the fuel tank is not a perfect cylinder. Rather, the fuel tank may have a curved, concave base that reduces the capacity of the tank as compared to a perfect cylinder of similar dimension. The concave portion may be assumed to take the shape of a truncated lobe of an ellipsoid whose long axis is parallel to the vertical axis of the tank. The height of the curved part of the base, $H_{base}$, from the bottom of the tank to the point where the curve meets the cylindrical part may be determined (e.g., measured). In various embodiments, $$H_{base} = 3.125 \text{ in}$$

The assumed thickness of the tank walls is:

$$t_{wall} = 0.11 \text{ in}$$

What follows is the equation for the internal radius of the tank for a given height above the base of the tank. We use the equation for the radius of an ellipse for the lower, curved part of the tank, and the nominal radius of the cylinder above that point. We also correct for the wall thickness, so that we get the internal radius.

if $h < H_{base}$:

$$R_c(h) = (R_0 * h/H_{base}) * \text{sqrt}(2*H_{base}/h - 1) - t_{wall}$$

else:

$$R_c(h) = R_0 - t_{wall}$$

The speed of sound through LPG may be determined (e.g., empirically). The speed of sound through LPG may be determined as a function of temperature. As will be appreciated, for other materials (e.g., for other fuels, the speed of sound through such fuels may be used). For the purposes of the present illustrative embodiments, the following temperature-dependent speed of sound will be used for LPG. This speed of sound as a function of temperature was empirically determined:

$$v_{sound}(\text{deg\_C}) = 881.34 \text{ m/s} - 6.6498 \text{ m/(s*C)} * (\text{Temperature\_in\_deg\_C})$$

As will be appreciated, the above formula may be rewritten and/or reused in various forms, including as a function of other temperature scales (e.g., degrees Fahrenheit, degrees Kelvin), including with more or fewer significant digits in the constants, or in any other suitable way, without departing from the contemplated embodiments. Similarly, various embodiments contemplate that other formulas, constants, variables, expressions, and the like may be rewritten and/or reused in other forms, such as through mathematical transformations, rounding, truncating, approximating, and the like, without departing from the contemplated embodiments.

For example, at 25 deg-C:

$$v_{sound}(25 \text{ C}) = 715.1 \text{ m/s}$$

Since there is significant change in the speed of sound through LPG over temperature, it may be desirable to compensate for temperature. In various embodiments, it may be desirable to use a fixed correction factor to speed and/or simplify processing, calculation, etc. For instance, it may be necessary to calculate an amount of fuel remaining using an embedded processor. In various embodiments, one can determine the percentage of velocity change per degree Celsius, $k_{therm}$. This factor can be used to directly adjust the time-of-flight measurements to correct for temperatures.

$$k_{therm} = (-6.6498 \text{ m/(s*C)})/(881.34 \text{ m/s}) = -\%0.755*1/C$$

In various embodiments, a value for $k_{therm}$ of $-\%0.75*1/C$ may be used. In various embodiments, a value for $k_{therm}$ of $-\%0.8*1/C$ may be used. In various embodiments, $k_{therm}$ may take a value in the range of $-\%0.8*1/C$ to $-\%0.7*1/C$. In various embodiments, $k_{therm}$ may take a value in the range of $-\%0.9*1/C$ to $-\%0.6*1/C$.

For example, at 30 degrees Celsius, the speed of sound would vary by about 3.8% compared to the speed at 25 Celsius:

$$k_{therm}*(30 \text{ C}-25 \text{ C}) = -3.77\%$$

Next, knowing the standard volume per weight of LPG, we can calculate the volume of any amount of LPG as a function of its weight.

$$\text{vol}(W) = W*1 \text{ gal}/(4.24 \text{ lb})$$

For a tank with 15 lb propane, for example:

$$\text{vol}(15 \text{ lb}) = 3.54 \text{ gal}$$

As will be appreciated, other materials may have different standard volumes per unit weight.

To determine the time of flight for a full tank, with 3.54 gal, we need to know the total depth of the LPG for that volume. Since part of the tank (i.e., at the base) is curved (e.g., curved inwardly), and since we already know by measuring what the height of the curved base of the tank is (i.e., $H_{base}$), it may be desirable to start by determining how much LPG volume is held in the lower curved part of the tank. We do so by integration of the incremental area of the tank over the height of the curved portion of the tank, as defined here:

$$v_{LPG}(h) = \text{Integral}\{0 \rightarrow h\}((R_c(h))^2 * \pi * dh)$$

Assuming the curved portion of the tank is full, we integrate the entire height of the base, and determine that the curved base of the tank holds 1.025 gallons of LPG:

$$v_{LPG}(H_{base})=1.025 \text{ gal, where } H_{base}=3.125 \text{ in}$$

Subtracting the 1.025 gallons in the curved base of the tank, we can calculate how much LPG is held in the simple cylindrical portion:

$$\text{vol}(15 \text{ lb})-v_{LPG}(H_{base})=2.513 \text{ gal}$$

Converting gallons to cubic inches:

$$2.513 \text{ gal}=580.5 \text{ in}^3$$

Using the simple equation for the volume of a cylinder, and solving for depth of the LPG in the cylindrical portion of the tank:

$$d_{cyl}=580.5 \text{ in}^3/((R_0-t_{wall})^2*\pi)=5.076 \text{ in}$$

We can now determine the depth of the LPG inside the (full) tank as:

$$D_{full}=d_{cyl}+H_{base}=8.20 \text{ in}$$

Our sensor will measure the time it takes for a sound wave to bounce off of the liquid/gas interface of the LPG inside the tank, which we will call the 'time of flight' (tof). The theoretical time of flight for this example tank, full with 15 lb LPG is:

$$\text{tof}_{full}=2*D_{full}/v_{sound}(25 \text{ C})=583 \text{ μs}$$

Note that if we didn't take the base shape into account, the LPG depth would simply be:

$$D_{full}=580.5 \text{ in}^3/((R_0-t_{wall})^2*\pi)=5.076 \text{ in}$$

and the time of flight for the full tank would be:

$$\text{tof}_{full}=2*D_{full}/v_{sound}(25 \text{ C})=361 \text{ μs}$$

Next, it may be desirable to consider how to implement the volume calculation in an embedded processor, where integration and differentiation are processor-intensive functions. In various embodiments, it might be easiest to assume that the tank is just a cylinder, which would mean that the volume of LPG is linear with its depth (and time of flight measurement):

$$\text{pct}_{linear}(\text{tof})=\text{tof}/\text{tof}_{full}=100\%$$

Figure 17:
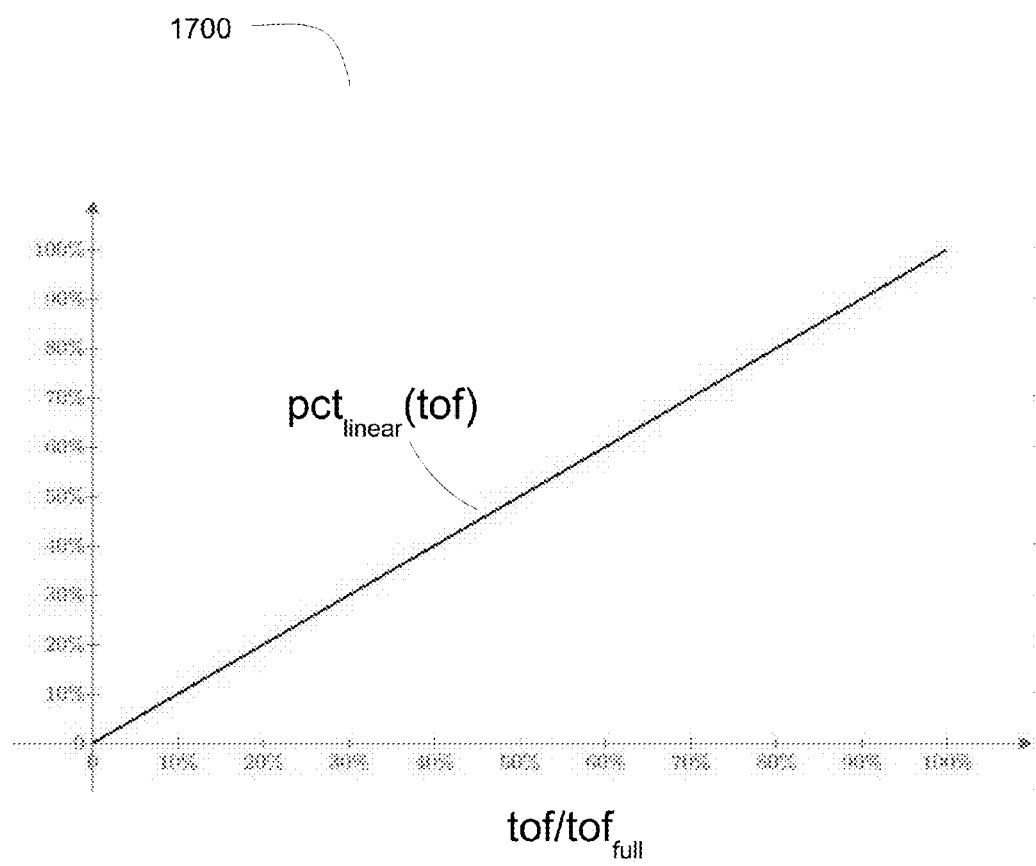
FIG. 17 illustrates a plot for estimating a percentage of fuel remaining based on a time of flight, according to some embodiments.

The plot 1700 is shown in FIG. 17. The x axis shows the measured time of flight (tof) as a percentage of the time of flight in a full tank (tam). The y axis shows the resultant estimate of the amount of material remaining in the tank as a percentage of the amount of material in a full tank. Under the assumption of a perfectly cylindrical tank, this plot is perfectly linear. In other words, for example, if the measured time of flight is only 40% of the time of flight in a full tank, then one would assume the tank is only 40% full.

Figure 18:
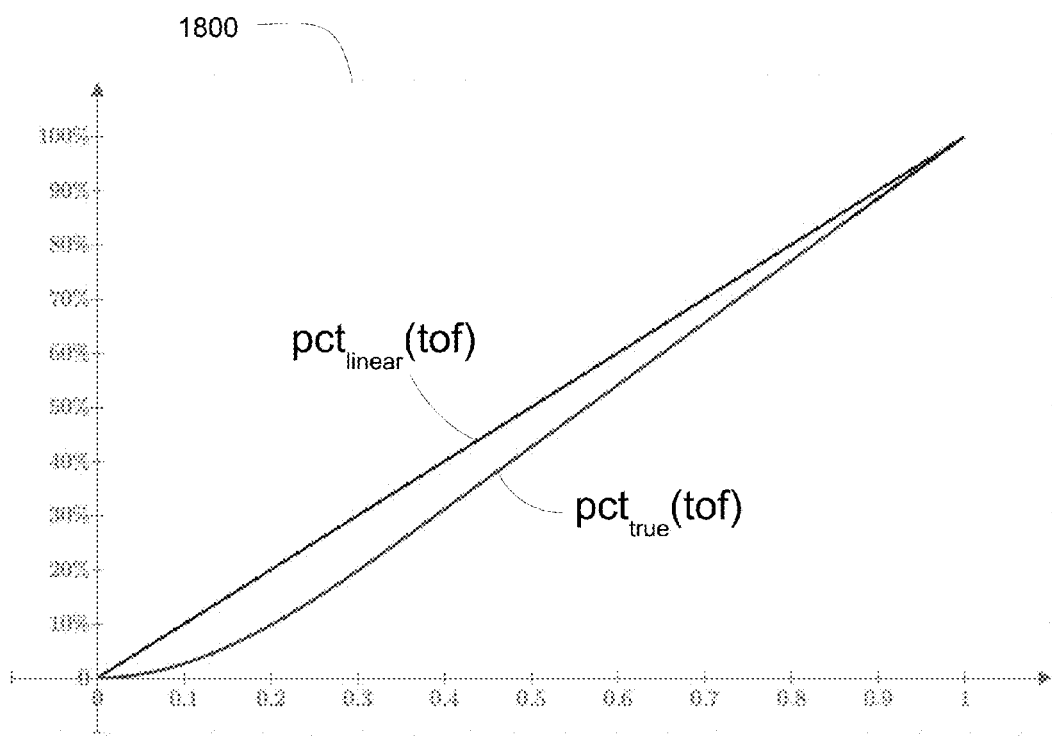
FIG. 18 illustrates a plot for estimating a percentage of fuel remaining based on a time of flight, according to some embodiments.

However, compared to the true volume, the error due to the curved base is evident in plot 1800, shown in FIG. 18. A simple estimate of the percent of LPG remaining in the tank based on an assumption of a cylindrical tank, denoted $\text{pct}_{linear}(\text{tof})$, consistently overestimates the percentage remaining when compared to the true percentage remaining, denoted $\text{pct}_{true}(\text{tof})$.

We can plot the error vs relative time of flight directly:

$$\text{err}(\text{tof})=\text{pct}_{linear}(\text{tof})-\text{pct}_{true}(\text{tof})$$

Figure 19:
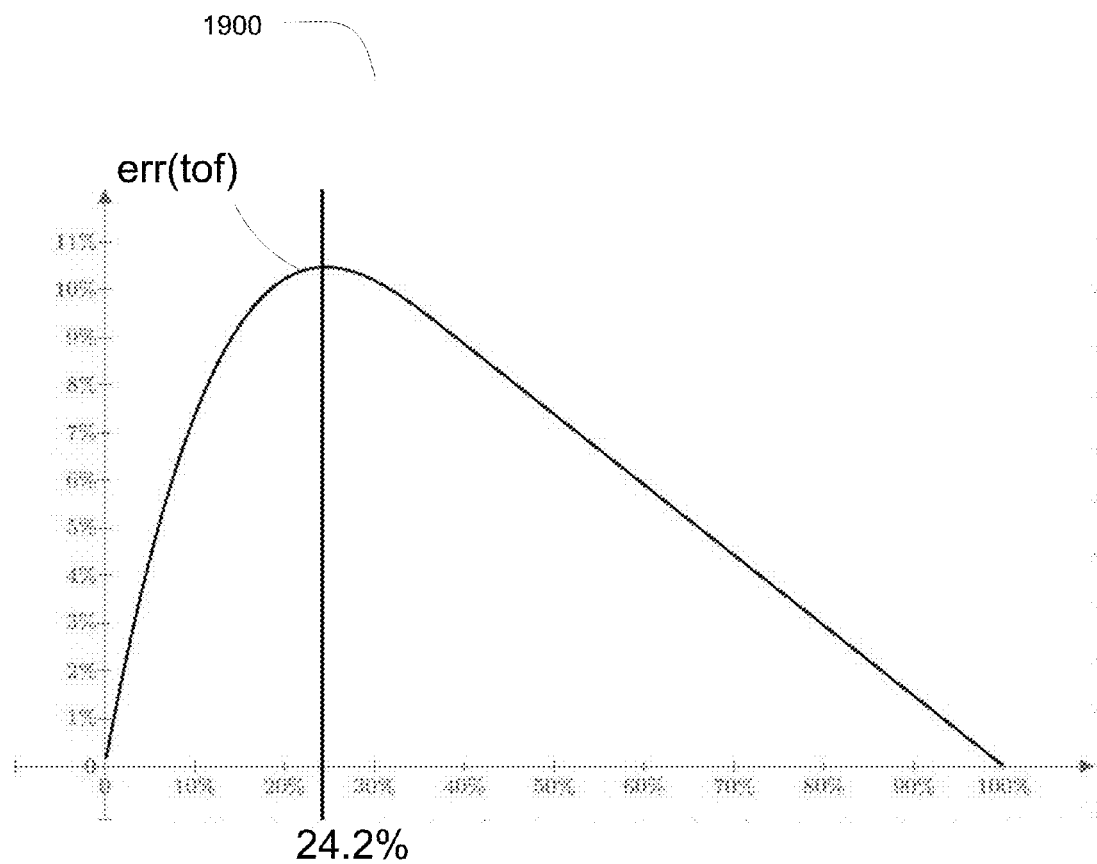
FIG. 19 illustrates a plot showing an error of an estimate of an amount of fuel remaining, according to some embodiments.

The resultant plot 1900 of the error is shown in FIG. 19.

The error graph is almost linear for the upper 70% of the range, and has a peak at about 24% of the full time of flight of about 10.5%:

$$\text{err}(25\%*\text{tof}_{full})=10.47\%$$

With a 10.47% error over 75% range, we can determine a shape correction factor: $k_{shape}=10.47\%/75\%=0.140$. As will be appreciated, various embodiments contemplate that $k_{shape}$ may take on other values, such as nearby values, rounded values, truncated values, values with more or fewer decimal points, etc. In various embodiments, $k_{shape}$ may be 0.15. In various embodiments, $k_{shape}$ may take on a value between 0.1 and 0.2.

This allows us to implement the percentage calculation (e.g., in firmware) as:

$$\text{pct}_{est}(\text{tof})=\text{tof}/\text{tof}_{full}-(1-\text{tof}/\text{tof}_{full})*k_{shape}$$

Figure 20:
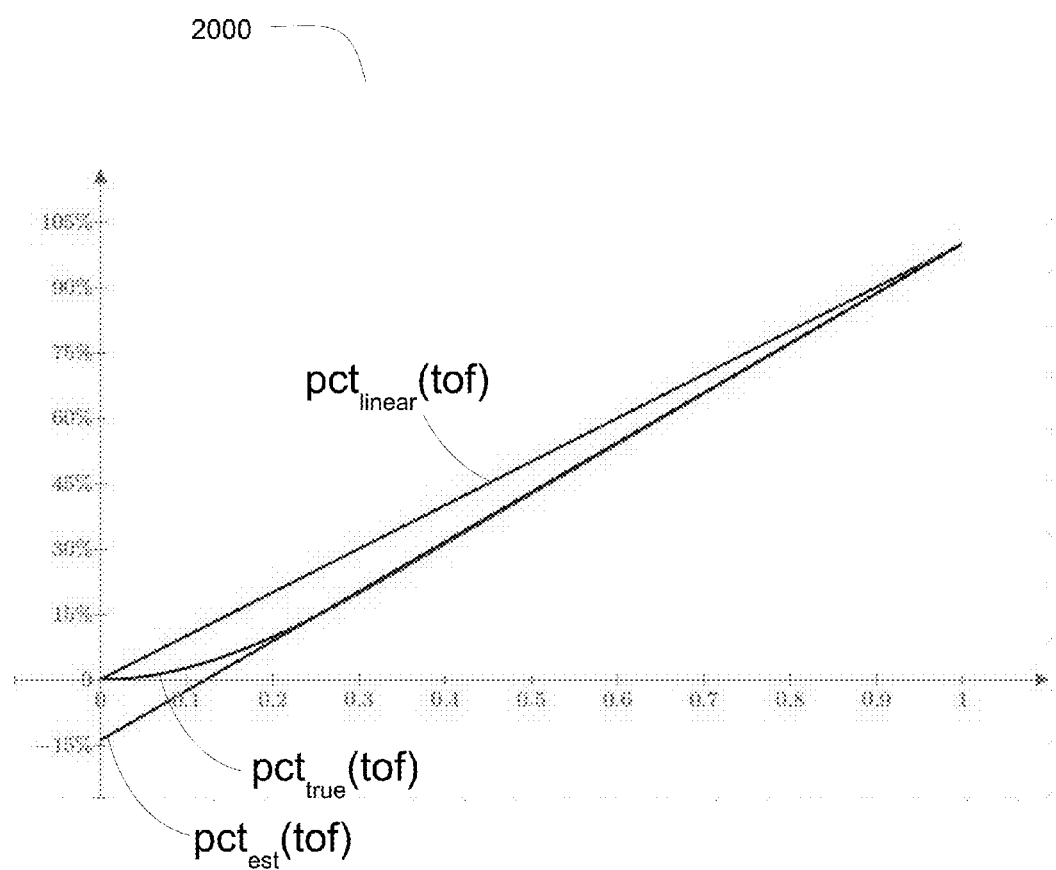
FIG. 20 illustrates a plot for estimating a percentage of fuel remaining based on a time of flight, according to some embodiments.
Figure 21:
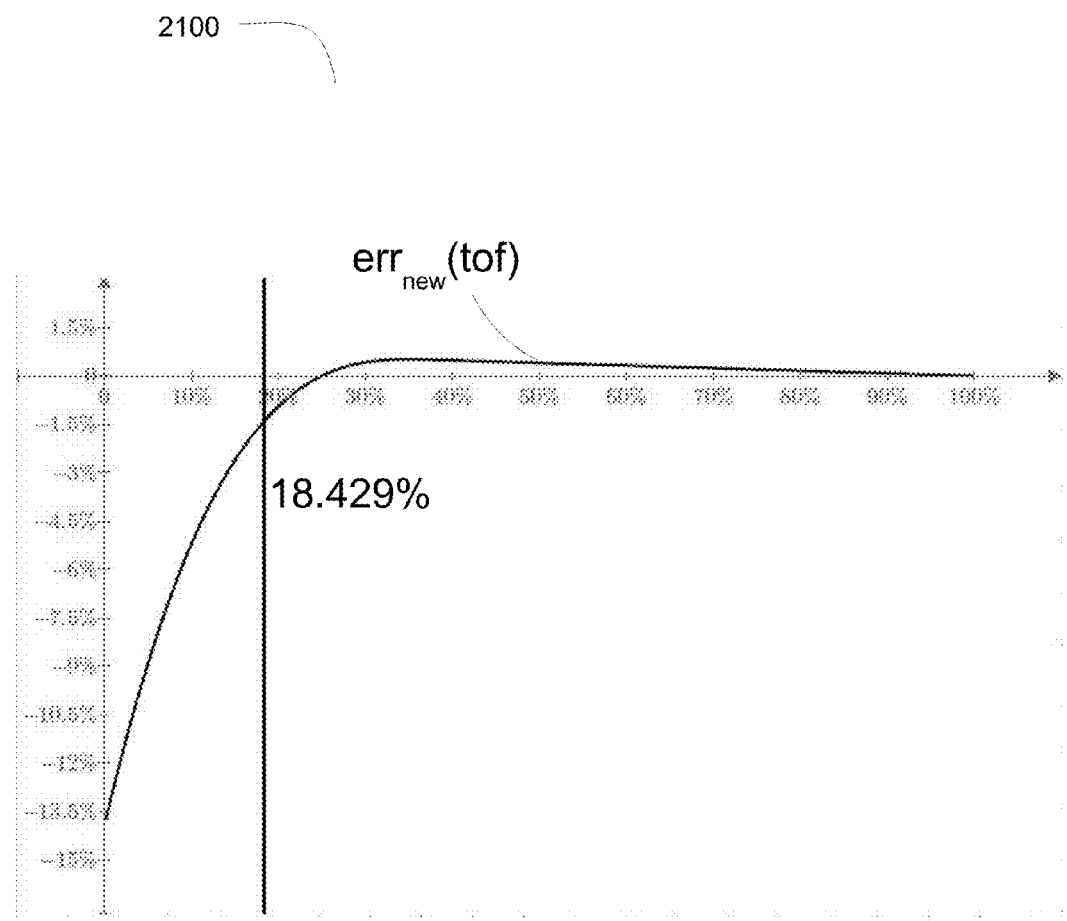
FIG. 21 shows a plot of an error in an estimate of the fullness of a tank.

Comparing the new, estimated percentage vs the linear and true plots, it is shown that the estimated percentage follows the true percentage almost perfectly until about 20% of the full time of flight. Plot 2000 in FIG. 20 shows three curves representing the percent fullness of a tank based on an assumption of a perfectly cylindrical tank ($\text{pct}_{linear}(\text{tof})$), based on the true value of percent fullness ($\text{pct}_{true}(\text{tof})$), and based on an estimated value of percent fullness using a shape correction factor ($\text{pct}_{est}(\text{tof})$)

The new error is less than 1.5% down to about 18% of the full time of flight. In other words, for flight times that are between 18% and 100% of the full flight time, the error of the estimated percentage of LPG remaining using a shape correction factor is less than 1.5% of the true value of the percentage of LPG remaining:

$$\text{err}_{new}(\text{tof})=\text{pct}_{est}(\text{tof})-\text{pct}_{true}(\text{tof})$$

Figure 22:
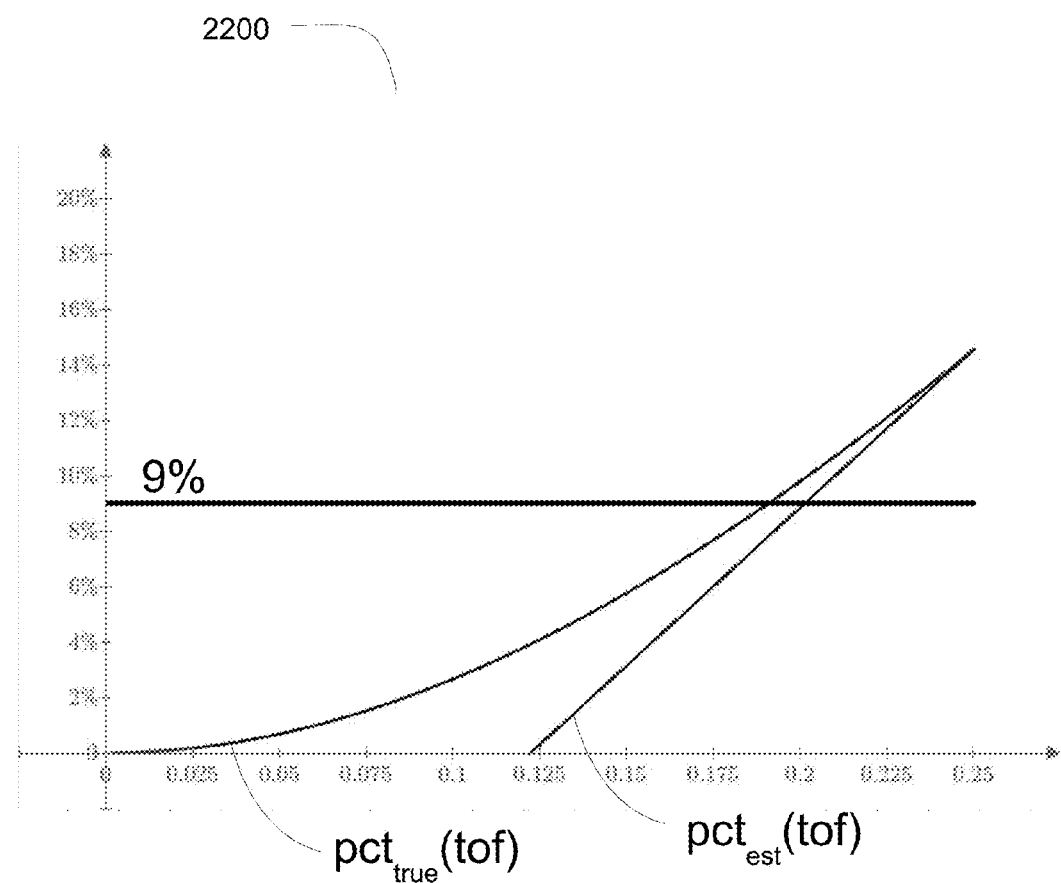
FIG. 22 shows a zoomed in version of a plot in FIG. 20.

Note that 18% of the full time of flight now corresponds to about 9% LPG level. We can zoom in on the plot 2000 for a better picture, shown in plot 2200 in FIG. 22.

$$\text{pct}_{est}(18\%*\text{tof}_{full})=6.6\%$$

$$\text{pct}_{true}(18\%*\text{tof}_{full})=8.071\%$$

It is shown, therefore, that in various embodiments, for LPG tank levels greater than 8%, our estimated percentage method for the embedded processor may be accurate to +/−1.5% of the true tank level. In some applications LPG levels of less than 10% may be considered in a single category, e.g., as "low". Errors once LPG levels fall within this category may be considered acceptable, e.g., since the user or another party may already be forewarned that fuel is low. Thus, in various embodiments, an error below 10% may be considered acceptable. The equation can be re-arranged for convenience as:

$$\text{pct}_{est}(\text{tof})=(\text{tof}/\text{tof}_{full})*(1+k_{shape})-k_{shape}$$

Now, adding in compensation for thermal variation of the speed of sound in LPG, the equation becomes:

$$\text{pct}_{LPG}(\text{tof,temp})=(\text{tof}/\text{tof}_{full})*(1+k_{shape})/(1+k_{therm}*(\text{temp}-25 \text{ C}))-k_{shape}$$

In various embodiments, this equation may be suitable for implementation in embedded applications due to its relative simplicity.

Assuming a fixed thermal correction factor $k_{therm}=-0.755\%*1/C$, this equation can be used with any LPG tank, assuming pre-calculated values of $k_{shape}$, and $\text{tof}_{full}$.

Sensor at the Top

Various embodiments have described a sensor located at the bottom of a storage tank, wherein acoustic waves are transmitted up through the liquid, reflect off the liquid/gas boundary, and travel back down through the liquid to the sensor. In such embodiments, the longer the round-trip flight time of the signal, the more material is in the tank.

According to various embodiments, a sensor may be located near or at the top of a tank. In such embodiments, acoustic waves may be transmitted down through the gas/air at the top of the tank (e.g., air/gas 1510, reflect off the liquid/gas boundary 1515), and return up through the air to the sensor. In such embodiments, the longer the round-trip flight time, the less material is in the tank.

As will be appreciated, in various embodiments, the sensor may be placed in other locations as well (e.g., on the side of the tank). In such cases, the overall tank geometry, and the location of the sensor relative to the potential liquid/gas boundary, may all play a role in calculating an amount of material remaining based on a round-trip flight time of an acoustic signal.

Separation of Function

In various embodiments, the sensor transmits and receives acoustic waves from a common location. However, various embodiments contemplate that acoustic waves may be transmitted and received from different locations. For example, a piezo electric transmitter may be placed in one location on the tank, and a separate piezo electric receiver may be placed at another location of the tank. The relative placement of these two components, together with the geometry of the tank, may play a role in in calculating an amount of material remaining based on a flight time of an acoustic signal.

In various embodiments, any other sensor components may be separated (e.g., be placed in separate housings, locations, etc.). In various embodiments, one or more sensor components may be combined.

It will be appreciated the foregoing represent but some of the contemplated embodiments, and that contemplated embodiments are not limited to the descriptions contained herein.

Embodiments

The following are embodiments, not claims:

B. A system comprising:
a first sensor coupled to a storage tank that contains material, the sensor operable to:
transmit an outgoing acoustic signal into the material at a first time; and
receive an incoming acoustic signal at a second time,
a communications port;
a memory operable to store a set of computer instructions and an indication of the tank geometry; and
a processor operable to execute the set of computer instructions to:
determine a quantity of the material in the storage tank based on the first time, based on the second time, and based on the indication of the tank geometry; and
cause an indication of the quantity to be transmitted to an external entity via the communications port.

In various embodiments, a shape correction factor may be used to estimate the percentage of material remaining in a tank, based on the following equation: $pct_{est}(tof) = (tof/tof_{full})*(1+k_{shape})-k_{shape}$ B.1 The system of embodiment B,
in which the indication of the tank geometry is a shape correction factor; and
in which, in determining the quantity of the material, the processor is operable to determine quantity as proportional to the difference between the second time the first time multiplied by the sum of the shape correction factor and one, minus the shape correction factor.

B.1.2 The system of embodiment B in which the shape correction factor is in the range of 0.1 and 0.2.

In various embodiments, a temperature of material in a tank may be used to estimate the quantity of material remaining in the tank.

A. A system comprising:
a first sensor coupled to a storage tank that contains material, the sensor operable to:
transmit an outgoing acoustic signal into the material at a first time; and
receive an incoming acoustic signal at a second time,
a second sensor configured to measure a temperature associated with the material;
a communications port;
a memory operable to store a set of computer instructions; and
a processor operable to execute the set of computer instructions to:
determine a quantity of the material in the storage tank based on the first time, based on the second time, and based on the temperature; and
cause an indication of the quantity to be transmitted to an external entity via the communications port.

A.7 The system of embodiment A.1, in which the measured temperature is denoted T with units of degrees Celsius, the system further comprising:
determining a thermal correction factor, $k_{therm}$, based on the temperature T,
in which, in determining the quantity of material in the storage tank, the processor is operable to:
determine that the storage tank is a cylinder with an inwardly curved base; and
determine a shape correction factor, $k_{shape}$, based on the curvature of the base,
determine a first round-trip travel time, $tof_{full}$, representative of a first difference between the second time and the first time that would be expected in the event that the storage tank was full,
determine a second round-trip travel time, tof, representative of a measured second difference between the second time and the first time,
determine the quantity as a percentage of fuel remaining in the storage tank, in which the quantity is determined as $(tof/tof_{full})*(1+k_{shape})+k_{therm}*(T-25 C))-k_{shape}$.

A.7.1 The system of embodiment A.7 in which $k_{therm}$ is in the range of $-\%0.8*1/C$ to $-\%0.7*1/C$, and in which $k_{shape}$ is in the range 0.1 to 0.2.

A.6 The system of embodiment A.1, further comprising:
determining a thermal correction factor based on the temperature,
in which, in determining the quantity of material in the storage tank, the processor is operable to:
determine that the storage tank is a cylinder with an inwardly curved base; and
determine a shape correction factor based on the curvature of the base,
determine quantity as proportional to the difference between the second time and the first time multiplied by the sum of the shape correction factor and one, divided by the sum of one and the product of the thermal correction factor and the difference between the temperature and 25 degrees Celsius, minus the shape correction factor.

A.5 The system of embodiment A in which the indication of the quantity is one of: (a) an indication of a percentage of the material remaining in the storage tank; and (b) an indication of an absolute quantity of the material remaining in the storage tank.

In various embodiments, a quantity sensor and temperature sensor may be integrated.

A.4 The system of embodiment A in which the first sensor and the second sensor are collocated within a common enclosure.

A.4.1 The system of embodiment A.4 in which the enclosure comprises a flexible material.

In various embodiments, a processor or controller or controller may be a separate module.

A.4.2 The system of embodiment A.4 in which the processor is located in a separate enclosure.

A.4.2.1 The system of embodiment A.4.2 in which the separate enclosure includes a display in communication with the processor.

A.2 The system of embodiment A in which the first sensor is a piezoelectric transducer.

A.3 The system of embodiment A further comprising a magnet to couple the first sensor to the storage tank.

In various embodiments, a quantity of material may be determined based on a round trip time, and/or based on a propagation speed.

A.1 The apparatus of embodiment A in which, in determining the quantity of material, the processor is operable to:
  determine a round-trip propagation time of the signal from the bottom of the storage tank to a surface of the material and back based on the difference between the second time and the first time;
  determine a propagation speed of the signal within the material based on the temperature;
  determine a distance from the bottom of the storage tank to the surface based on the propagation time and based on the propagation speed, thereby determining a depth of the material;
  determine a geometry of the storage tank; and
  determine the quantity of the material based on the depth of the material and the geometry of the storage tank.

A.1.1 The system of embodiment A.1,
  in which, in determining a geometry of the storage tank, the processor is operable to determine that the storage tank is a cylinder with a first cross-sectional area, and
  in which, in determining the quantity of the material based on the depth of the material and the geometry of the storage tank, the processor is operable to determine quantity as depth multiplied by the cross-sectional area.

In various embodiments, a percentage of material remaining in a tank may be determined based on the following formula: $pct_{est}(tof) = (tof/tof_{full}) \ast (1 + k_{shape}) - k_{shape}$ A.1.2 The system of embodiment A.1,
  in which, in determining a geometry of the storage tank, the processor is operable to:
    determine that the storage tank is a cylinder with an inwardly curved base; and
    determine a shape correction factor based on the curvature of the base, and
  in which, in determining the quantity of the material based on the depth of the material and the geometry of the storage tank, the processor is operable to determine quantity as proportional to the round-trip propagation time multiplied by the sum of the shape correction factor and one, minus the shape correction factor.

A.5 The system of embodiment A in which, in measuring a temperature associated with the material, the sensor is operable to measure a temperature of the material.

A.6 The system of embodiment A in which, in measuring a temperature associated with the material, the sensor is operable to measure a temperature of a shell of the storage tank.

A.8 The system of embodiment A in which the first sensor and the second sensor are contained within a first housing, and in which the processor is contained within a second housing, the system further comprising a first communication link traversing the distance between the first and second housings.

A.8.3 The system of embodiment A.8 further comprising:
  a first jack contained within the second housing, in which the first communication link is a first cable interfacing to the first jack at one end of the first cable;
  a second jack contained within the second housing;
  a third sensor contained within a third housing separate from the second housing; and
  a second cable interfacing to the second jack at one end of the second cable, and to the third sensor at the other end of the second cable.

In various embodiments, an external, unrelated sensor can relay unrelated data through the controller.

A.8.3.1 The system of embodiment A.8.3 in which the third sensor is in proximity to a cooking grill and in which the third sensor is operable to:
  collect a second temperature associated with the cooking grill; and
  transmit an indication of the second temperature to the processor via the second cable.

In various embodiments, a cable connects the device where the processor is to the device where the sensors are.

A.8.1 The system of embodiment A.8, in which the communication link is a cable that is attached to the first housing at one end of the cable and to the second housing at the other end of the cable.

In various embodiments, there is a controller with a display.

A.8.2 The system of embodiment A.8 in which the second housing also contains a display that is operable to display the quantity.

The invention claimed is:

1. A system comprising:
  a first sensor coupled to a storage tank that contains material, the sensor operable to:
    transmit an outgoing acoustic signal into the material at a first time; and
    receive an incoming acoustic signal at a second time,
  a second sensor configured to measure a temperature associated with the material;
  a communications port;
  a memory operable to store a set of computer instructions; and
  a processor operable to execute the set of computer instructions to:
    determine a quantity of the material in the storage tank based on the first time, based on the second time, and based on the temperature; and
    cause an indication of the quantity to be transmitted to an external entity via the communications port.

2. The apparatus of claim 1 in which, in determining the quantity of material, the processor is operable to:
  determine a round-trip propagation time of the signal from the bottom of the storage tank to a surface of the material and back based on the difference between the second time and the first time;
  determine a propagation speed of the signal within the material based on the temperature;
  determine a distance from the bottom of the storage tank to the surface based on the propagation time and based on the propagation speed, thereby determining a depth of the material;

determine a geometry of the storage tank; and
determine the quantity of the material based on the depth of the material and the geometry of the storage tank.

3. The system of claim 2,
in which, in determining a geometry of the storage tank, the processor is operable to determine that the storage tank is a cylinder with a first cross-sectional area, and
in which, in determining the quantity of the material based on the depth of the material and the geometry of the storage tank, the processor is operable to determine quantity as depth multiplied by the cross-sectional area.

4. The system of claim 2,
in which, in determining a geometry of the storage tank, the processor is operable to:
determine that the storage tank is a cylinder with an inwardly curved base; and
determine a shape correction factor based on the curvature of the base, and
in which, in determining the quantity of the material based on the depth of the material and the geometry of the storage tank, the processor is operable to determine quantity as proportional to the round-trip propagation time multiplied by the sum of the shape correction factor and one, minus the shape correction factor.

5. The system of claim 1 in which the indication of the quantity is one of: (a) an indication of a percentage of the material remaining in the storage tank; and (b) an indication of an absolute quantity of the material remaining in the storage tank.

6. The system of claim 1, in which the measured temperature is denoted T with units of degrees Celsius, the system further comprising:
determining a thermal correction factor, $k_{therm}$, based on the temperature T,
in which, in determining the quantity of material in the storage tank, the processor is operable to:
determine that the storage tank is a cylinder with an inwardly curved base; and
determine a shape correction factor, $k_{shape}$, based on the curvature of the base,
determine a first round-trip travel time, $tof_{full}$, representative of a first difference between the second time and the first time that would be expected in the event that the storage tank was full,
determine a second round-trip travel time, tof, representative of a measured second difference between the second time and the first time,
determine the quantity as a percentage of fuel remaining in the storage tank, in which the quantity is determined as $(tof/tof_{full})*(1+k_{shape})/(1+k_{therm}*(T-25\ C))-k_{shape}$.

7. The system of claim 6 in which $k_{therm}$ is in the range of $-\%0.8*1/C$ to $-\%0.7*1/C$, and in which $k_{shape}$ is in the range 0.1 to 0.2.

8. The system of claim 1 in which the first sensor and the second sensor are collocated within a common enclosure.

9. The system of claim 8 in which the enclosure comprises a flexible material.

10. The system of claim 8 in which the processor is located in a separate enclosure.

11. The system of claim 10 in which the separate enclosure includes a display in communication with the processor.

12. The system of claim 1 in which the first sensor is a piezoelectric transducer.

13. The system of claim 1 further comprising a magnet to couple the first sensor to the storage tank.

14. The system of claim 1 in which, in measuring a temperature associated with the material, the sensor is operable to measure a temperature of the material.

15. The system of claim 1 in which, in measuring a temperature associated with the material, the sensor is operable to measure a temperature of a shell of the storage tank.

16. The system of claim 1 in which the first sensor and the second sensor are contained within a first housing, and in which the processor is contained within a second housing, the system further comprising a first communication link traversing the distance between the first and second housings.

17. The system of claim 16 further comprising:
a first jack contained within the second housing, in which the first communication link is a first cable interfacing to the first jack at one end of the first cable;
a second jack contained within the second housing;
a third sensor contained within a third housing separate from the second housing; and
a second cable interfacing to the second jack at one end of the second cable, and to the third sensor at the other end of the second cable.

18. The system of claim 17 in which the third sensor is in proximity to a cooking grill and in which the third sensor is operable to:
collect a second temperature associated with the cooking grill; and
transmit an indication of the second temperature to the processor via the second cable.

19. The system of claim 16, in which the communication link is a cable that is attached to the first housing at one end of the cable and to the second housing at the other end of the cable.

20. The system of claim 16 in which the second housing also contains a display that is operable to display the quantity.

21. A system comprising:
a first sensor coupled to a storage tank that contains material, the sensor operable to:
transmit an outgoing acoustic signal into the material at a first time; and
receive an incoming acoustic signal at a second time,
a communications port;
a memory operable to store a set of computer instructions and an indication of the tank geometry; and
a processor operable to execute the set of computer instructions to:
determine a quantity of the material in the storage tank based on the first time, based on the second time, and based on the indication of the tank geometry; and
cause an indication of the quantity to be transmitted to an external entity via the communications port.

22. The system of claim 21,
in which the indication of the tank geometry is a shape correction factor; and
in which, in determining the quantity of the material, the processor is operable to determine quantity as proportional to the difference between the second time the first time multiplied by the sum of the shape correction factor and one, minus the shape correction factor.

* * * * *